(12) United States Patent
Inamdar et al.

(10) Patent No.: US 8,849,910 B2
(45) Date of Patent: Sep. 30, 2014

(54) SYSTEM AND METHOD FOR USING QUALITY OF SERVICE WITH WORKLOAD MANAGEMENT IN AN APPLICATION SERVER ENVIRONMENT

(75) Inventors: Rajendra Inamdar, N. Chelmsford, MA (US); Anthony G. Vlatas, Brookline, NH (US); Sandeep Shrivastava, Westford, MA (US); Michael Cico, Hampton, NH (US); Akbar Ali Ansari, Hopkinton, MA (US)

(73) Assignee: Oracle International Corporation, Redwood Shores, CA (US)

( * ) Notice: Subject to any disclaimer, the term of this patent is extended or adjusted under 35 U.S.C. 154(b) by 421 days.

(21) Appl. No.: 13/298,211

(22) Filed: Nov. 16, 2011

(65) Prior Publication Data
US 2012/0311138 A1    Dec. 6, 2012

Related U.S. Application Data

(60) Provisional application No. 61/493,315, filed on Jun. 3, 2011.

(51) Int. Cl.
G06F 15/16    (2006.01)
H04L 29/08    (2006.01)
G06F 11/34    (2006.01)
H04L 12/26    (2006.01)

(52) U.S. Cl.
CPC ............ *H04L 67/22* (2013.01); *G06F 11/3404* (2013.01); *H04L 43/04* (2013.01); *H04L 43/0817* (2013.01); *G06F 11/3495* (2013.01); *G06F 11/3423* (2013.01); *G06F 11/3433* (2013.01); *G06F 2201/875* (2013.01); *G06F 11/3409* (2013.01); *G06F 2201/865* (2013.01); *H04L 67/2819* (2013.01); *H04L 67/02* (2013.01)

USPC .......................................................... 709/204

(58) Field of Classification Search
CPC ..... H04L 67/22; H04L 67/02; H04L 67/2819; H04L 43/04; H04L 43/3404; G06F 11/3409; G06F 11/3433; G06F 11/3495; G06F 11/3404
USPC .......................................................... 709/224
See application file for complete search history.

(56) References Cited

U.S. PATENT DOCUMENTS 5,745,652 A    4/1998    Bigus
8,185,651 B2   5/2012    Moran et al.

(Continued)

OTHER PUBLICATIONS

Revanuru, Workload Management in WebLogic Server 9.0, pp. 1-16, Mar. 7, 2006.*

(Continued)

*Primary Examiner* — Larry Donaghue
(74) *Attorney, Agent, or Firm* — Meyer IP Law Group

(57) ABSTRACT

Described herein are systems and methods for collecting and surfacing metrics with respect to their classification; and the use of the metrics by a workload manager and other application monitoring tools to provide quality-of-service and workload management. Each request is classified, either by the application server or another process. A request classification identifier (RCID) is associated with each request, and thereafter flows with that request as it is being processed. The RCID value is used by data collectors at various points in the system to aggregate the metrics, and a workload manager collects the metrics. The collected metrics are then processed by a rules engine at the workload manager, which analyzes the metrics and generates adjustment recommendations to provide quality-of-service and workload management.

20 Claims, 18 Drawing Sheets

(56) References Cited

U.S. PATENT DOCUMENTS

| | | |
|---|---|---|
| 2002/0099818 A1 | 7/2002 | Russell et al. |
| 2004/0215848 A1 | 10/2004 | Craddock et al. |
| 2005/0120160 A1 | 6/2005 | Plouffe et al. |
| 2005/0262507 A1* | 11/2005 | Langen et al. ............... 718/100 |
| 2005/0273456 A1* | 12/2005 | Revanuru et al. ............... 707/1 |
| 2008/0022282 A1* | 1/2008 | Cherkasova et al. .......... 718/102 |
| 2008/0189432 A1 | 8/2008 | Abali et al. |
| 2008/0192752 A1 | 8/2008 | Hyslop et al. |
| 2008/0275985 A1* | 11/2008 | Kundu ........................ 709/224 |
| 2009/0204669 A1 | 8/2009 | Allan |
| 2010/0091676 A1* | 4/2010 | Moran et al. ................. 370/252 |
| 2010/0107172 A1 | 4/2010 | Calinescu et al. |
| 2010/0161616 A1 | 6/2010 | Mitchell |
| 2010/0169494 A1 | 7/2010 | Machulsky et al. |
| 2010/0315958 A1* | 12/2010 | Luo et al. .................... 370/248 |
| 2011/0004701 A1 | 1/2011 | Panda et al. |
| 2011/0016473 A1* | 1/2011 | Srinivasan ................... 718/105 |
| 2011/0228940 A1* | 9/2011 | Shah et al. .................. 380/259 |
| 2011/0307458 A1 | 12/2011 | Lipscomb et al. |
| 2012/0042034 A1 | 2/2012 | Goggin et al. |
| 2012/0311138 A1* | 12/2012 | Inamdar et al. ............... 709/224 |

OTHER PUBLICATIONS

Clark, et al., "Live Migration of Virtual Machines", NSDI '05: $2^{nd}$ Proceedings of the Symposium on Networked Systems Design & Implementation, Jan. 1, 2005, pp. 273-286, UNSENIX Association, Berkeley, CA, United States.

* cited by examiner

Interface (e.g., Request Classification Data
Runtime Managed Bean Interface) 314

```
public interface WLDFRuntimeMBean extends RuntimeMBean {
public RequestClassificationDataRuntimeMBean get
RequestClassificationDataRuntime();
}
package weblogic.management.runtime;
/**
 * RuntimeMBean to provide access to the data collected
 * and classified by Request Classification.
 * @exclude
 */
public interface RequestClassificationDataRuntimeMBean extends
RuntimeMBean {
  /**
    * Retrieves the request data collected as per the query. @param query SQL-Like
query expression that specifies the data to be retrieved and the filter conditions.
@return the result set containing rows of data in a two-dimensional array containing
rows and columns. The first row of data contains the column names in the result set. */
   public Object[][] getRequestData(String query);
  /**
    * Retrieves the distinct column names that corresponds to
    * the known classification types.
    * @return String[] containing the names of
    * the classification types known currently.
    */
   public String[] getClassificationTypes();
   /** Retrieves the distinct values for the specified classification type. @param type
The request classification type name for which the distinct values need to be retrived.
@return String[] containing the names of the classification type values for the given
type. */
   public String[] getClassificationValues(String type);
   /** Retrieves the distinct request metrics names being collected by the system. @
return String[] containing the names of the request metrics collected by the system. */
   public String[] getMetricNames();
     }
```

*FIGURE 3*

Configuration Settings 316

```
package weblogic.management.configuration;
public interface DomainMBean extends ConfigurationMBean {
/**
 * <p>If true, QoS metrics collection is enabled.
 * If false, the QoS metrics collection will not be enabled. </p>
 * @exclude
 * @dynamic
 * @return If true, QoS metrics collection will be enabled.
 */
public boolean isQoSMetricsEnabled();
/**
 * <p>Sets the value of the QoSMetricsEnabled attribute.</p>
 * @exclude
 * @see #isQoSMetricsEnabled
 * @param enable If true, QoS metrics collection will be enabled.
 * @default false
 */
public void setQoSMetricsEnabled(boolean enable);

/**
 * <p>If true, APM metrics collection is enabled.
 * If false, the APM metrics collection will not be enabled. </p>
 * @exclude
 * @dynamic
 * @return If true, APM metrics collection will be enabled.
 */
public boolean isAPMMetricsEnabled();
/**
 * <p>Sets the value of the APMMetricsEnabled attribute.</p>
 * @exclude
 * @see #isAPMMetricsEnabled
 * @param enable If true, APM metrics collection will be enabled.
 * @default false
 */
public void setAPMMetricsEnabled(boolean enable);
```

FIGURE 5

SYSTEM AND METHOD FOR USING QUALITY OF SERVICE WITH WORKLOAD MANAGEMENT IN AN APPLICATION SERVER ENVIRONMENT

CLAIM OF PRIORITY

This application claims the benefit of priority to U.S. Provisional Patent Application titled "SYSTEMS AND METHODS FOR DETERMINING METRICS AND WORKLOAD MANAGEMENT"; Application No. 61/493,315; filed Jun. 3, 2011, which is incorporated by reference herein.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS-REFERENCED APPLICATIONS

This application is related to U.S. patent application Ser. No. 13/298,176, filed on Nov. 16, 2011 entitled "SYSTEM AND METHOD FOR COLLECTING REQUEST METRICS IN AN APPLICATION SERVER ENVIRONMENT", by Inamdar, et. al., which application is incorporated herein by reference.

FIELD OF INVENTION

Embodiments of the present invention are generally related to application server environments and diagnostic frameworks, and are particularly related to the collection and surfacing of request metrics in such environments; and the use of metrics by a workload manager to provide Quality-of-Service and workload management.

BACKGROUND

Enterprise-class computer servers are becoming increasingly sophisticated and complex, which poses a greater need to monitor system health, and prevent unintended system interruptions. Enterprise-class computer servers also provide business critical applications that interact with other(s) by providing and/or consuming services, and as deployment of these applications increase, so does the resource management needed to ensure optimal application performance.

Traditionally, system administrators had to monitor, plan for and adjust system metrics to prevent system interruptions. However, this approach is not as useful in fast-changing environments where real-time management is needed. These are the areas that embodiments of the invention are intended to address.

SUMMARY

Described herein are systems and methods for collecting and surfacing (e.g. via JMX) of request metrics with respect to classification to be used by a Quality-of-Service (QoS) component and other application monitoring tools. In accordance with an embodiment, each request is classified, either by the application server or another process. For example, requests can be classified by a HTTP/Web server acting as a front-end tier to the application server. A unique diagnostic context is associated with each request, and thereafter flows with that request as it is being processed. The diagnostic context includes a Request Classification Identifier (RCID) value which carries request classifications. The RCID value is used by data collectors at various points in the system to aggregate collected metrics. Metrics for a particular resource can be tracked across two dimensions, namely the resource itself and the RCID values. This enables the system to identify utilization of a particular resource by requests belonging to a particular classification. In accordance with an embodiment, the system collects the request metrics information in a unified manner and surfaces it to clients/tools with a single interface. Since different tools may wish to use the same information for different purposes (e.g., a Quality-of-Service tool may use it for resource re-allocations to ensure that important business objectives are met, whereas an Application Performance Management tool, or similar monitoring tool, may use it for monitoring, resource workload analysis, and capacity planning purposes), various rules can be employed to provide support for different tools.

Also described herein are systems and methods for collecting metrics by a workload manager (e.g., Application Server Work Load Manager/ASWLM) to provide Quality-of-Service and workload management. The system enables collection of metrics from one or more managed servers, e.g., by a workload manager running on an administration server which queries each managed server periodically and then uses the metrics to perform Quality-of-Service and workload management. In accordance with an embodiment, the workload manager comprises an application server (e.g., WebLogic) and an HTTP server (e.g., Oracle HTTP Server/OHS). Incoming requests can be classified into different request types or performance classes, and assigned a priority based upon business objectives (referred to as performance objectives). From a business point of view, requests belonging to one performance class may be more (or less) important than those belonging to another performance class. The system can manage the workload to ensure that the performance objectives of different performance classes are satisfied. When sufficient resources (CPU, memory, etc) are available, they can be distributed so that the performance objectives for all performance classes are satisfied. Similarly, when sufficient resources are not available, resources from less business-critical performance classes can be diverted to more important ones so that overall business objectives are optimized. The system can also provide adjustment recommendations to an administrator, to help the administrator configure the system to better satisfy the performance objectives. For example, if a particular computer is in violation of the configured performance objectives, the adjustment recommendation may advise e.g., adjusting workload managers, adjusting server cluster size, adjusting connection pool size, and/or providing surge protection.

BRIEF DESCRIPTION OF THE FIGURES

FIG. 3 is an illustration of a request classification data runtime managed bean interface to define methods used to query the metrics data collected for different classification types, in accordance with an embodiment.

FIG. 5 is an illustration of configuration settings within the application server used to enable and disable metric collection, in accordance with an embodiment.

DETAILED DESCRIPTION

Figure 1:
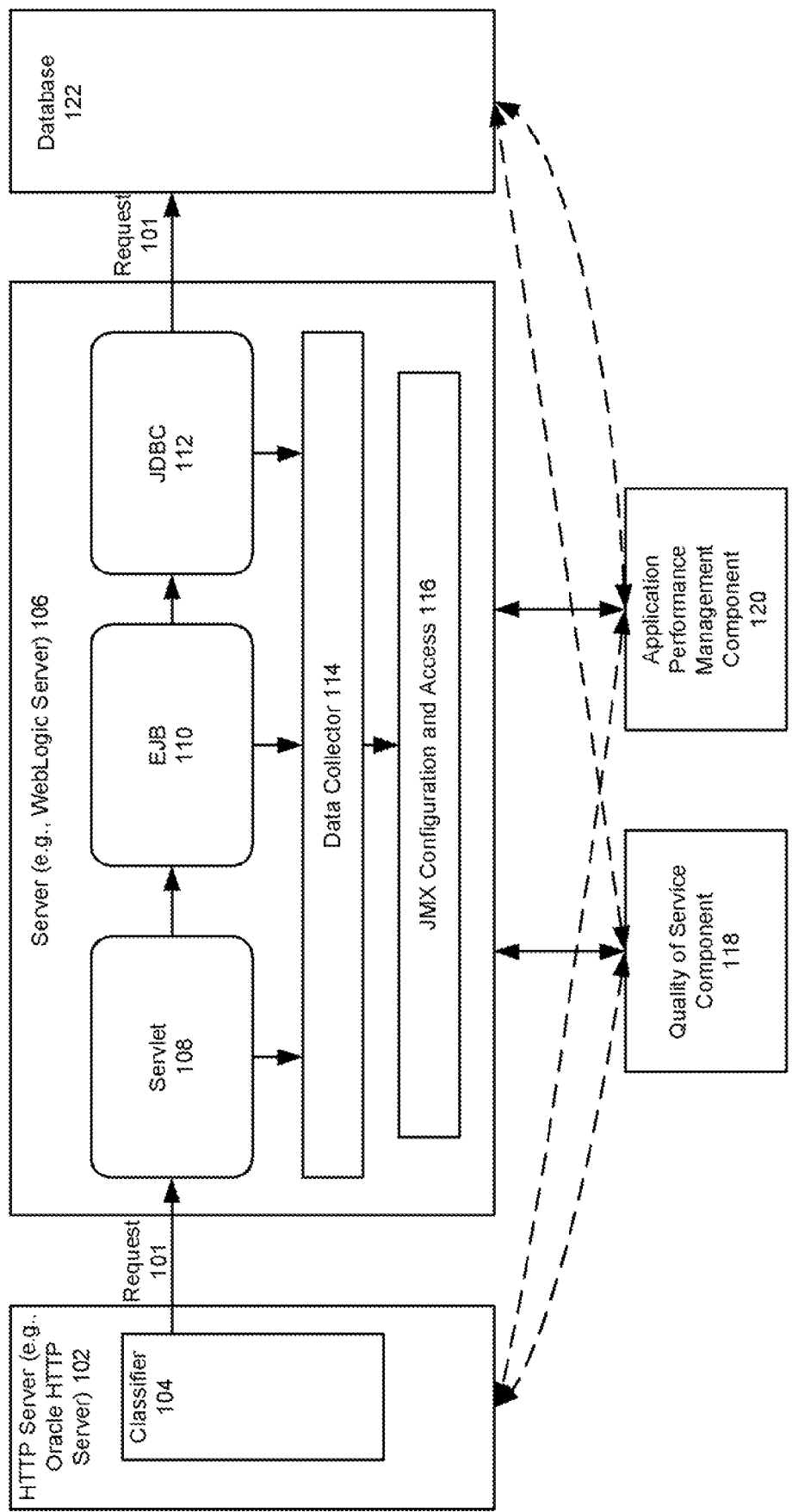
FIG. 1 shows an exemplary system for collecting and surfacing request metrics in the application server environment, in accordance with an embodiment.

Described herein are systems and methods for collecting and surfacing (e.g. via JMX) of request metrics with respect to classification to be used by a Quality-of-Service (QoS) component and other application monitoring tools.

In accordance with an embodiment, each request is classified, either by the application server or another process. For example, requests can be classified by a HTTP/Web server acting as a front-end tier to the application server. A unique diagnostic context is associated with each request, and thereafter flows with that request as it is being processed. The diagnostic context includes a Request Classification Identifier (RCID) value which carries request classifications. The RCID value is used by data collectors at various points in the system to aggregate collected metrics. Metrics for a particular resource can be tracked across two dimensions, namely the resource itself and the RCID values. This enables the system to identify utilization of a particular resource by requests belonging to a particular classification.

The system collects the request metrics information in a unified manner and surfaces it to clients/tools with a single interface. Since different tools may wish to use the same information for different purposes (e.g., a Quality-of-Service tool may use it for resource re-allocations to ensure that important business objectives are met, whereas an Application Performance Management tool, or similar monitoring tool, may use it for monitoring, resource workload analysis, and capacity planning purposes), various rules can be employed to provide support for different tools.

For example, in accordance with an embodiment, the Quality-of-Service tool can recognize a performance class, wherein requests are classified into different performance classes according to its rules. Requests belonging to one performance class may be more (or less) important than those belonging to another performance class from a business point of view. To enable this, the Quality-of-Service tool needs the requests to be classified into various performance classes, to enable it to gather metrics relative to those performance classes.

Similarly, the Application Performance Management tool requires the ability to apportion the resource usage per application and business transaction type, including monitoring functionality from the business perspective, rather than the low level threads of execution. To enable this, the Application Performance Management tool needs individual requests to be classified into request types, to enable it to gather metrics relative to those request types.

Other tools within the application server environment can make use of the request metrics in other ways.

Also described herein are systems and methods for collecting metrics by a workload manager (e.g., Application Server Work Load Manager/ASWLM) to provide Quality-of-Service and workload management. The system enables collection of metrics from one or more managed servers, e.g., by a workload manager running on an administration server which queries each managed server periodically and then uses the metrics to perform Quality-of-Service and workload management.

In accordance with an embodiment, the workload manager comprises an application server (e.g., WebLogic) and an HTTP server (e.g., Oracle HTTP Server/OHS). Incoming requests can be classified into different request types or performance classes, and assigned a priority based upon business objectives (referred to as performance objectives). From a business point of view, requests belonging to one performance class may be more (or less) important than those belonging to another performance class. The system can manage the workload to ensure that the performance objectives of different performance classes are satisfied. When sufficient resources (CPU, memory, etc) are available, they can be distributed so that the performance objectives for all performance classes are satisfied. Similarly, when sufficient resources are not available, resources from less business-critical performance classes can be diverted to more important ones so that overall business objectives are optimized. The system can also provide adjustment recommendations to an administrator, to help the administrator configure the system to better satisfy the performance objectives.

In accordance with an embodiment, the workload manager can store workload manager policies at an HTTP server acting as a front-end tier to the system. The policies contain the definition of performance classes and their performance objectives. The HTTP server parses the workload manager policies, and uses this information to classify incoming requests in accordance with the policies. The requests flow from the HTTP server to managed servers, where each managed server collects and aggregates metrics from the requests. The workload manager can query each managed server periodically to collect its metrics. The collected metrics are then processed by a rules engine at the workload manager, which analyzes the metrics and generates adjustment recommendations.

For example, if a particular computer is in violation of the configured performance objectives, the adjustment recommendation may advise e.g., adjusting workload managers, adjusting server cluster size, adjusting connection pool size, and/or providing surge protection.

1. Collecting and Surfacing Request Metrics from Requests

As described above, in accordance with an embodiment, described herein are systems and methods for collecting and surfacing (e.g. via JMX) of request metrics with respect to classification to be used by a Quality-of-Service (QoS) component and other application monitoring tools.

FIG. 1 shows an exemplary system of an application server environment and diagnostic framework for collecting and surfacing request metrics in the application server environment to be used by a Quality-of-Service (QoS) component and other application monitoring tools. In accordance with an embodiment, QoS functionality introduces a notion of performance class, where requests are classified into different performance classes according to configured rules. Requests belonging to one performance class may be more, or less, important than those belonging to another performance class e.g., from a business point of view. The QoS component ensures that performance objectives of different performance classes are satisfied. When sufficient resources (e.g., CPU, memory, etc.) are available, those resources can be redistributed so that the performance objectives for all performance classes are satisfied. When sufficient resources are not available, resources from less critical performance classes can be diverted to more important ones, so that the overall objectives are optimized.

For this purpose, the requests are classified into various performance classes, enabling the QoS component to gather metrics relative to the performance classes.

As shown in FIG. 1, a request 101 flows across different tiers of a system, such as an HTTP/Web server 102 tier (e.g., Oracle HTTP Server (OHS)), an application server 106 tier (e.g., WebLogic Application Server) and a database 122 tier. Requests can be classified, e.g., at the OHS by a classifier 104. In accordance with an embodiment, a request can be classified according to rules, and metrics can be collected relative to the classifications. The classification information flows with the request so that metrics gathered at collection points can be correlated with current classification for that request. For example, as the request flows through different components within the application server, e.g., servlet 108, EJB 110 and JDBC 112, request metrics can be collected according to the request's classification. Collected metrics can be made available to a QoS component 118, an Application Performance Management (APM) component 120, and other application monitoring tools through an interface (e.g., JMX interface 116).

In accordance with an embodiment, the QoS component can use the classification information for resource re-allocation to ensure that performance objectives are met. For example, the classification information can be used by the QoS component to change the fair-share configuration parameters on work managers to adjust resources made available to different performance classes. APM can use the classification information for monitoring, resource workload analysis, and capacity planning purposes. For example, the classification information can be used by the APM to apportion the resource usage per application and business transaction type, and can provide monitoring functionality from the performance objective perspective, rather than the low level threads of execution.

Figure 2:
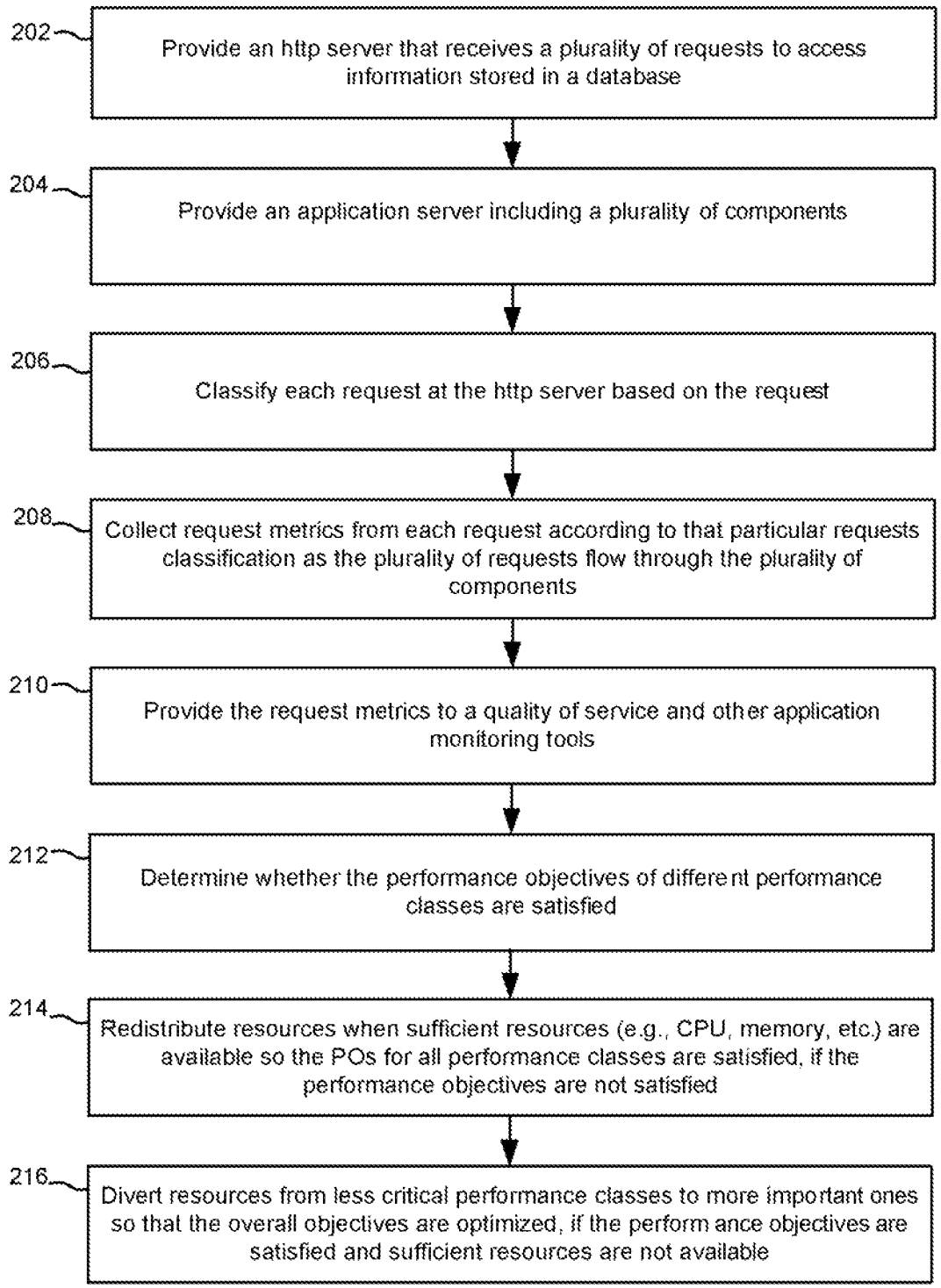
FIG. 2 shows a flowchart of a method in accordance with an embodiment, for collecting and surfacing request metrics in an application server environment.

FIG. 2 shows a flow chart of a method in accordance with an embodiment, for collecting and surfacing request metrics in the application server environment to be used by a Quality-of-Service (QoS) component and other application monitoring tools. As shown in FIG. 2, at step 202, a HTTP/Web server is provided that receives a plurality of requests to access information stored in a database, and at step 204 an application server including a plurality of components is provided.

At step 206, each request is classified at the HTTP/Web server based on the request. For example, a request can flow across different tiers of the system, such as an HTTP/Web server tier (e.g., Oracle HTTP Server/OHS), an application server tier (e.g., WebLogic Application Server) and a database tier. Requests can be classified, e.g., at the OHS by a classifier. In accordance with an embodiment, a request can be classified according to rules, and metrics can be collected relative to the classifications. The classification information flows with the request so that metrics gathered at collection points can be correlated with current classification for that request. For example, at step 208, as the request flows through different components within the application server, e.g., servlet, EJB and JDBC, request metrics can be collected according to the request's classification.

In accordance with an embodiment, the metrics gathered at collection points can be presented as tabular data in rows and columns, and can include request classification columns, component columns and request metric columns. There can be a request classification column for each classification type defined.

For example, as shown in Table 1, there can be columns for QoS and APM classification types. Component columns can include the component type and component name, and there can be a request metric column for each metric collected. For example, there can be columns for metrics such as CPU utilization, memory pressure and request execution time. It will be evident that the examples provided in Table 1 are provided for purposes of illustration, and that in accordance with other embodiments, other data and metrics can be collected and presented as tabular data.

At step 210, the collected metrics are made available to a QoS component, an Application Performance Management (APM), and other application monitoring tools through an interface (e.g., a JMX interface).

TABLE 1

| QoS | APM | COMP_TYPE | COMP_INSTANCE | CPU Utilization (CPU_UTL) | Memory Pressure (MEMORY) | Request Execution Time (EXEC_TIME) |
| --- | --- | --- | --- | --- | --- | --- |
| Gold | Checkout | Servlet | MyServlet-1 | X | Y | Z |
| Gold | Inventory Check | Servlet | MyServlet-2 | D | E | F |
| Silver | Inventory Check | Servlet | MyServlet-2 | L | M | N |
| Bronze | Checkout | EJB | MyEJB-1 | P | Q | R |
| Bronze | Inventory Check | EJB | MyEJB-2 | T | U | V |
| Silver | Checkout | JDBC | MyJDBC-1 | A | B | C |

Additionally, in accordance with an embodiment, the metric data can be queried by specifying the classification type as the criteria to filter and aggregate the result. The query expression can be pseudo-SQL allowing users to select the results from the metrics data table as per the condition specified. In accordance with an embodiment, the form of the query expression can be:

```
SELECT COL_NAME, aggregate_function(METRIC_COL_NAME)
WHERE {COL_NAME operator VALUE} (AND|OR)
{COL_NAME operator VALUE}
```

In the above example, the column name parameter (e.g., COL_NAME) can be any of the columns corresponding to the request classification types, e.g., request classification types QoS, APM. The result set can include fixed columns, e.g., a component type column (i.e., COMP_TYPE) and a component instance column (i.e., COMP_INSTANCE).

In accordance with an embodiment, additional columns can be specified in the query. For example, the metric column name (i.e., METRIC_COL_NAME) can be CPU utilization, memory pressure and request execution time. In accordance with an embodiment, aggregate functions can be supported for the metric columns, such as the sum of the metric values; the count of the number of values; the minimum value of the metric; the maximum value of the metric; the mean value of the metric; the sum of the squares; and the standard deviation of the metric value collection. These functions return the aggregate of the values for the specified metric in the result set row.

In accordance with an embodiment, the WHERE clause parameter can support operators such as: "=" (equals); "!=" (not equals); LIKE (pattern matching with percent matching any number of chars and matching a single char); IN (search for result in the value set). Multiple where clause parameter conditions may be combined using the "AND" or "OR" logical operators. These conditions can be nested within parentheses ( ) which can have a higher order of precedence.

For example, the QoS component can use the classification information for resource re-allocation to ensure that performance objectives are met, and the APM component can use the classification information for monitoring, resource workload analysis, and capacity planning purposes.

At step 212, it is determined whether the performance objectives of different performance classes are satisfied. At step 214, if the performance objectives are not satisfied, redistribute resources when sufficient resources (e.g., CPU, memory, etc.) are available so the performance objectives for all performance classes are satisfied. At step 216, if the performance objectives are satisfied and sufficient resources are not available, divert resources from less critical performance classes to more important ones so that the overall objectives are optimized.

The data collected for the requests and classified by the RCID can be made available from the request classification data runtime managed bean interface 314 over JMX or another interface. The interface can define methods used to query the metrics data collected for different classification types, and methods used to get the metadata about what columns exist in the tabular structure. In accordance with an embodiment, an example of the interface can be phrased as shown in FIG. 3.

Figure 4:
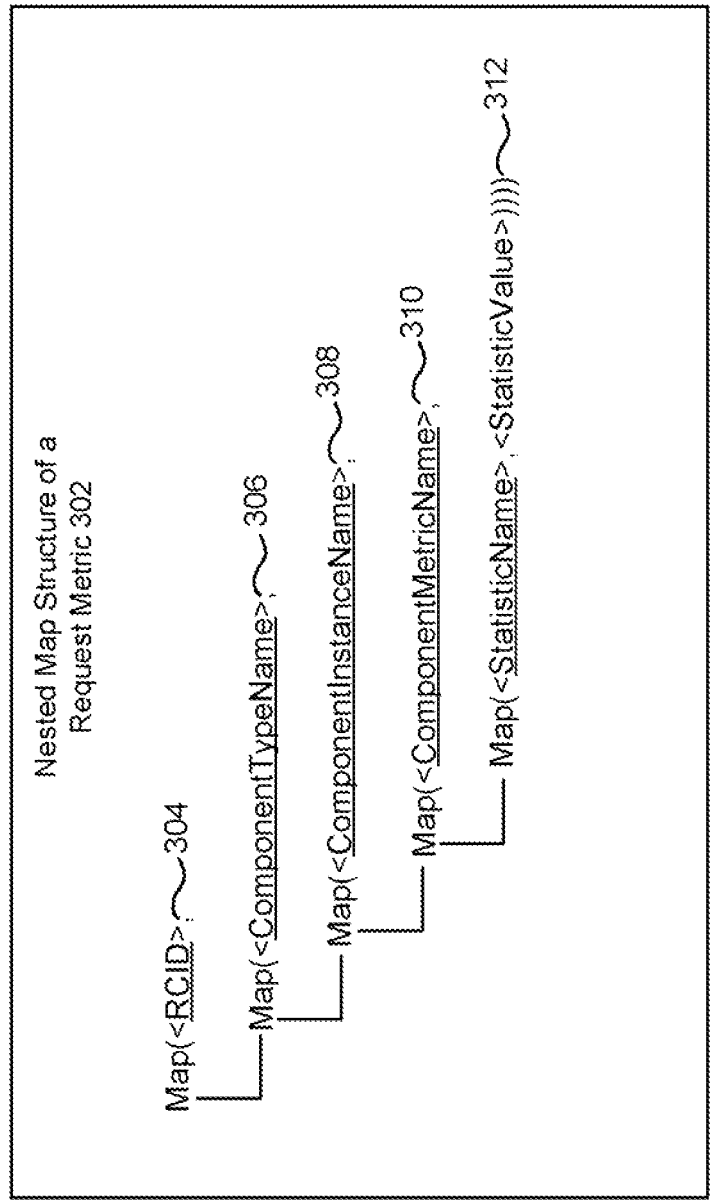
FIG. 4 is an illustration of a nested map structure of a request metric for use in the system, in accordance with an embodiment.

FIG. 4 is an illustration of a nested map structure of a request metric, in accordance with an embodiment. At various points within an application server, request metrics can be collected and aggregated by one or more application servers with respect to request classifications, and the resulting aggregated metrics can be made available to tools through an interface (e.g., a JMX interface), can be queried, and can be tracked e.g., using the nested map structure.

For example, in accordance with an embodiment, the metric data can be requested by specifying one of the aggregate functions listed above. Table 2 shows one example. It will be evident that the simple query examples provided in Table 2 are provided for purposes of illustration, and that in accordance with other embodiments, other examples of the usage and working of the query expression where the SELECT clause contains only metric data columns and the results returned are aggregates of the selected columns, are possible.

TABLE 2

| Query | Result |
|---|---|
| SELECT SUM(CPU_UTIL) WHERE QoS='Gold' | Servlet, MyServlet-1, X |
| | Servlet, MyServlet-2, D |
| SELECT AVG(MEMORY) WHERE QoS IN {'Gold','Silver'} | Servlet, MyServlet-1, Y |
| | Servlet, MyServlet-2, AVG(E,M) |
| | JDBC, MyJDBC-1, B |
| SELECT STD_DEV(EXEC_TIME) WHERE APM = 'Checkout' | Servlet, MyServlet-1, Z |
| | EJB, MyEJB-1, R |
| | JDBC, MyJDBC-1, C |
| SELECT SUM(CPU_UTIL), AVG(EXEC_TIME) WHERE QoS='Bronze' | EJB, MyEJB-1, P,R |
| | EJB, MyEJB-2, T,V |
| SELECT MIN(EXEC_TIME) WHERE QoS='Gold' AND APM = 'Checkout' | Servlet, MyServlet-1, Z |
| SELECT SUM(EXEC_TIME) WHERE COMP_TYPE IN ('Servlet', 'EJB') | Servlet, MyServlet-1, SUM(Z) |
| | Servlet, MyServlet-2, SUM(F,N) |
| | EJB, MyEJB-1, SUM(R) |
| | EJB, MyEJB-2, SUM(V) |

As shown in Table 2, the table tabulates the simple query examples where the select parameter clause contains only metric data columns and the results returned are aggregates of the selected columns. In accordance with an embodiment, it is possible to have multiple metric columns in a query, but all of them may not be applicable to a given component type, component instance combination, or a metric may not be enabled for a given collection type. In that case, the column value will be null in the result set for all aggregate functions (sum, minimum, maximum, average) except count, which will return a value of zero.

Table 3 illustrates the usage of other non-metric columns in the select clause parameter, where the data is returned in multiple row sets.

As shown in Table 3, the row in the result set {Servlet, MyServlet-2, SUM(F,N)} aggregates the values for the rows where the values for the component type and component instance columns are equal. The rows with distinct values of the columns in the result set are aggregated and the metric values returned for the distinct set.

TABLE 3

| Query | Result Set |
|---|---|
| SELECT QoS, SUM(CPU_UTIL) | Servlet, Myservlet-1, Gold, X, |
| | Servlet, Myservlet-2, Gold, D |
| | Servlet, Myservlet-2, Silver, L, |
| | JDBC, MyJDBC-1, Silver, A |
| | EJB, MyEJB-1, Bronze, P, |
| | EJB, MyEJB-2, Bronze, T |
| SELECT APM, AVG(MEMORY) WHERE QoS IN {'Gold','Silver'} | Servlet, MyServlet-1, Checkout, Y, |
| | Servlet, MyServlet-2, InventoryCheck, AVG(E,M) |
| | JDBC, MyJDBC-1, Checkout, B |

Returning to FIG. 4, a nested map structure 302 of a request metric includes one or more fields, each field having data associated therewith. For example, the Request Classification Field (RCID) 304 can carry request classifications with the request as the request flows through the system. As described above, the classification information flows with the request so that metrics gathered at different points can be correlated with current classification for that request. The RCID value can be used by data collectors at various points in an application server to aggregate collected metrics, and metrics for a given resource (e.g., an application server component such as a servlet) can be tracked across two dimensions, the resource itself and RCID values. Thus, it is possible to identify utilization of a specific resource by requests belonging to a particular classification.

In accordance with an embodiment, the request's classification can be encoded in the RCID field. The RCID field can be phrased as:

```
RCID :== CLASSIFICATION ( ',' CLASSIFICATION)*
CLASSIFICATION :== CLASS_TYPE ':' CLASS_VALUE
CLASS_TYPE :== ('0'..'9' | 'a'..'z' | 'A'..'Z')*
CLASS_VALUE :== ('0'..'9' | 'a'..'z' | 'A'..'Z' | '_' | '!' | ' ' | '=' |
'+' | '-' | '/')*
```

In the above example, specified US-ASCII characters can be used in class type and class value. For example, in an environment where two classifiers are active, one for QoS and one for APM, under QoS classification rules, the computed classification value of QoS can be 'Gold'. For example, in accordance with an embodiment, under APM classification rules, the computed classification value for APM can be 'Checkout'. The RCID contents can be, e.g.: APM:Checkout, QoS:Gold. In accordance with an embodiment, the classification types can be alpha-numerically ordered within the RCID field. Class type names can represent IDs which have an existing definition and may allow characters which can not be directly represented in the class value. Class values for a defined class type can be either plain values or encoded values. This has two benefits, e.g., in that it avoids potential collisions between encoded and plain values, and it allows intermediate components that may need to interpret the class value to quickly and reliably determine whether it is encoded or not. In accordance with an embodiment, to have a mix of plain and encoded representations, different class types can be defined to represent each style. For example, class type "MyId" can be defined for plain ID values and class type "MyIdB64" can be defined for encoded values.

In accordance with an embodiment, a "well-known" RCID has a pre-defined value and meaning. Well-known RCIDs are generally used to differentiate between scenarios where a classification is not available but where it is still valuable for metrics to be collected and queried for the scenario. An example of a well-know RCID is RSVD:Unclassified, which can be used for tracking metrics for requests that were not classified with an RCID. RSVD:Core is another example of a well-known RCID. The RSVD:Core RCID is used for tracking metrics at core levels where the diagnostic context is not available to determine the RCID.

The RCID can contain multiple classification types that have different lifecycle requirements. The ability to manage the lifecycle of the classification values for a particular classification type is implementation specific. For example, the metrics collection performed within the application server may have the ability to determine when a QoS classification value is no longer needed, but may not be able to determine that an APM classification value is no longer needed. In accordance with an embodiment, a RCID field can contain a classification value that does not have a lifecycle. In such a case, component implementations can impose a limit on the lifetime of these values. For example, an application server can timeout these values if they are inactive after a period of time.

In accordance with an embodiment, when an RCID contains a mix of classification values, the lifetime of the entire RCID is the lifetime of the longest lived component value within that RCID. For example, metrics collected by an application server for an RCID value which contains a QoS value and an APM value will remain until both the QoS and APM values within that RCID have expired.

Further shown in FIG. 4 are the component type name field 306 and the component instance name field 308. In accordance with an embodiment, resource consumption metrics are measured for specific component instances of component types executing within an application server. Component type names and component instance names can be exposed by the data access querying mechanism in that it will allow queries which can specify component names. In accordance with an embodiment, component type names are used as the <ComponentTypeName> field in the nested map structure. The value in that map is itself a map which is keyed by the component instance name <ComponentInstanceName> field. The available component type names are pre-defined. In accordance with an embodiment, component instance names are used as the <ComponentInstanceName> field described in the nested map structure. Component instance names can be determined at runtime using naming conventions specific to the component type.

It will be evident that the examples provided in Table 4 are provided for purposes of illustration, and that in accordance with other embodiments, other component type names and component instance naming could be used.

TABLE 4

| Component Type Name | Component Instance Name | Enabled By | Example |
|---|---|---|---|
| RequestClass | <request-class-name> | QoS, APM | myRequestClassName |
| WebApp | <servletName\|URI> | QoS, APM | Action\|/admin/login.do |
| EJB | <appName\|ejbCompName\|ejbName> | APM | MedRecEar\|webServicesEjb\|MedRec WebServicesEJB |
| JDBC | <poolName> | QoS | JMSJDBCConnectionPool |
| JAXWS | <URI> | APM | /ParticipantPortType11 |
| JAXRPC | <currentParty\|action> | APM | http://host:port/myWebService/my WebService\|m:echoString |

In accordance with an embodiment, the various collection points for metrics can differ depending on whether the metrics are collected for the QoS or APM component, the component type being measured, and the virtual machine (e.g., Java Virtual Machine) that the server is running on. For example, configuration settings within the application server can be used to enable and disable metric collection for the QoS and APM component independently of each other. For example, a component type may be specific to the QoS component; may be enabled for both the QoS and APM component; may have a metric that is only specific to the APM component, and/or may be a metric that requires vendor specific virtual machine support to be collected.

In accordance with an embodiment, configuration settings 316 within the application server to enable and disable metric collection for the QoS and APM component independently can be phrased as shown in FIG. 5.

Certain metrics may not be available on all virtual machine implementations. For example, these metrics can fall into two general categories: standard application programming interface (API) metrics and vendor specific API metrics. Standard API metrics have a standard API defined for determining whether the metric is supported, and a standard API for collecting the metric. Vendor specific API metrics do not have a standard API defined for collecting the metric. For these metrics, if there is an API defined, code is explicitly added to support the metric on a particular virtual machine. It will be evident that the examples provided in Table 5 are provided for purposes of illustration, and that in accordance with other embodiments, other component metric name fields 310 can be used to collect other metrics.

TABLE 5

| Metric Name | Type | Units | Enabled By | Components |
|---|---|---|---|---|
| MEMORY | long | Bytes | APM | all |
| CPU_UTL | long | Nanoseconds | QoS, APM | all |
| EXEC_TIME | long | Nanoseconds | QoS, APM | all |
| BLOCK_TIME | long | Milliseconds | QoS, APM | all |
| RESOURCE_WAIT | long | Nanoseconds | QoS | JDBC |
| OUTBOUND_EXEC | long | Nanoseconds | | JDBC, WebService |
| WORKMANAGER_WAIT | long | Nanoseconds | QoS, APM | RequestClass |

Referring to Table 5, by way if example, MEMORY can be the amount of memory allocated within the thread for the method invocation being measured. CPU_UTL can be an approximation of the amount of CPU time spent within the thread for the method invocation being measured. This can be measured on platforms where ThreadMXBean.isThreadCpuTimeSupported( ) returns true. Direct access may be provided on some JVMs such as JRockit. EXEC_TIME can be the amount of time elapsed overall for the method invocation being measured. This can be calculated using System.nanoTime. BLOCk_TIME can be the amount of elapsed time a thread was blocked for the method invocation being measured. This can be measured on platforms where ThreadMXBean. isThreadContentionMonitoringSupported( ) returns true. RESOURCE_WAIT can be the amount of elapsed time spent getting access to a resource. For example, for JDBC, this is the time spent waiting to get a connection. OUTBOUND_EXEC can be the amount of time elapsed overall for the outbound operation being measured. This is calculated using System.nanoTime, and can enable the isolation of the time spent waiting for an outbound call to an entity that may not be tracked with specific metrics (e.g., a foreign database).

In accordance with an embodiment, metric statistics can be kept for the tracked metrics. These statistics can vary depending on the specific type of metric being collected and the feature that is enabled (e.g., a QoS feature or an APM feature). The metric statistics can be defined in the statistic name field 312 shown in FIG. 4. Table 6 is provided for purposes of illustration, and that in accordance with other embodiments, other statistics can be kept for metrics.

TABLE 6

| Statistic | Type | Description |
|---|---|---|
| Count | long | Number of values |
| Min | long | Minimum value |
| Max | long | Maximum value |
| Sum | double | Sum of all values |
| sum_of_squares | double | Sum of the squares (tracked for APM metrics only) |

Figure 6:
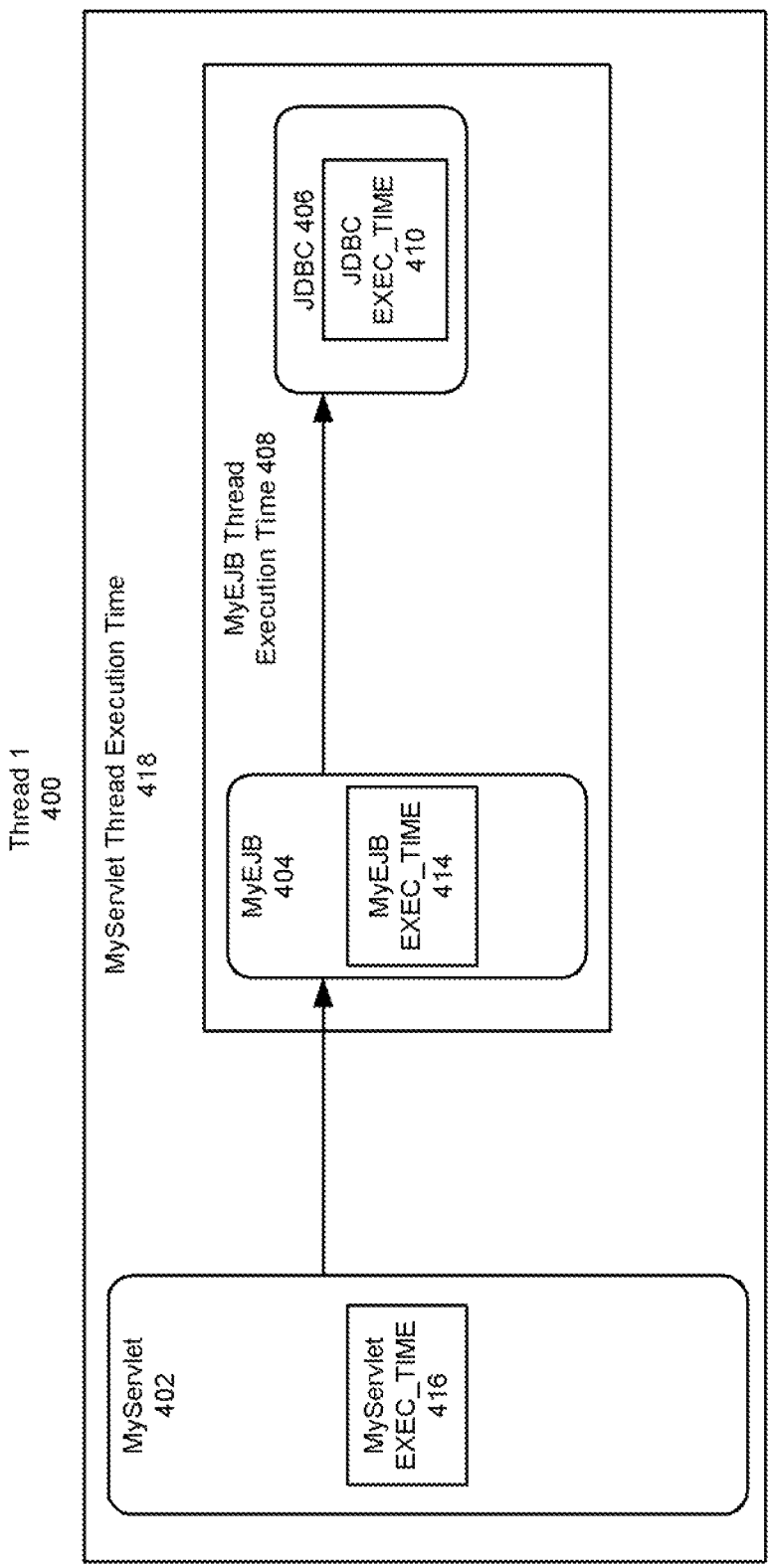
FIGS. 6-8 illustrates the effect of an application's structure on the collected request metrics, in accordance with an alternate embodiment.
Figure 7:
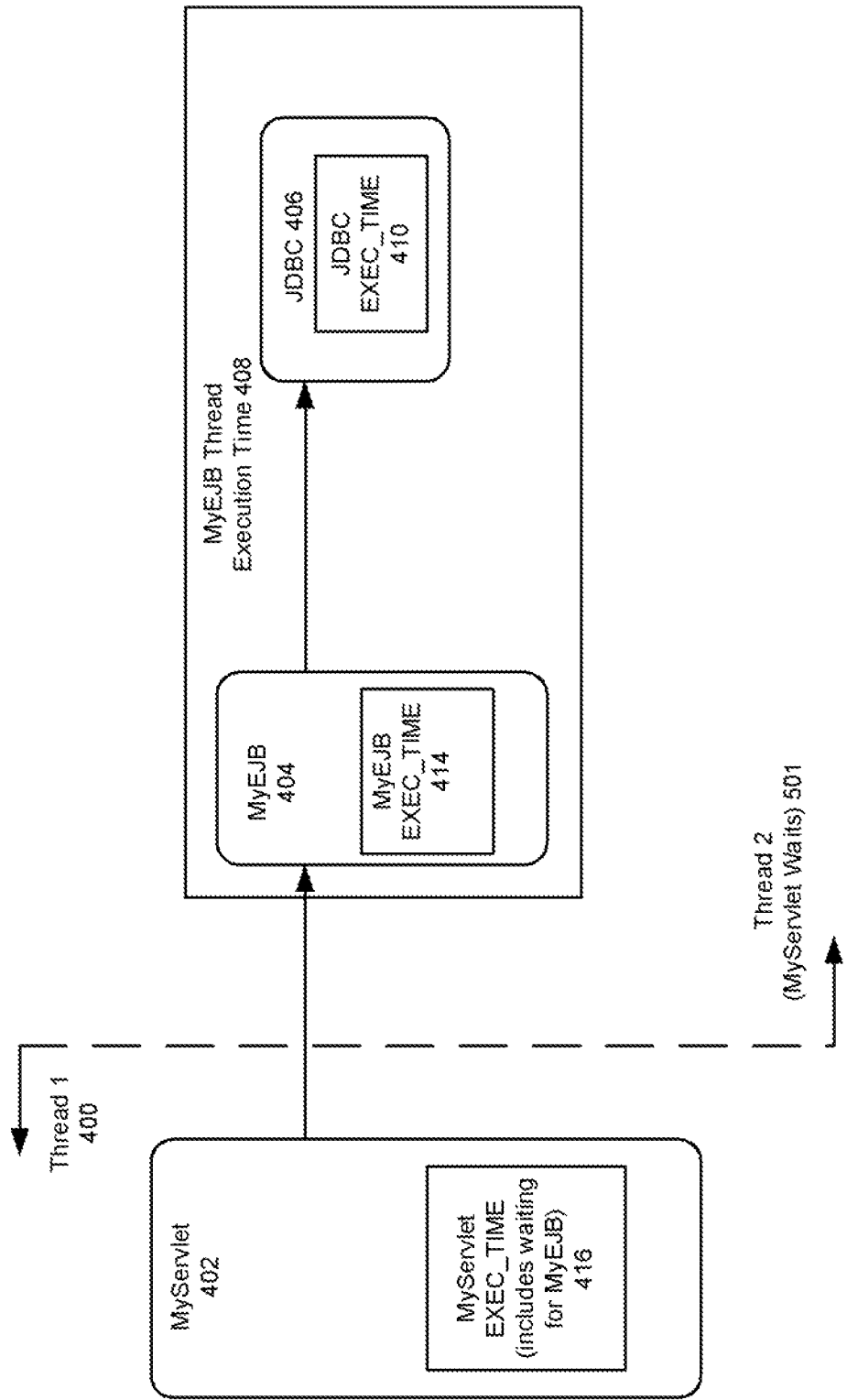
Figure 8:
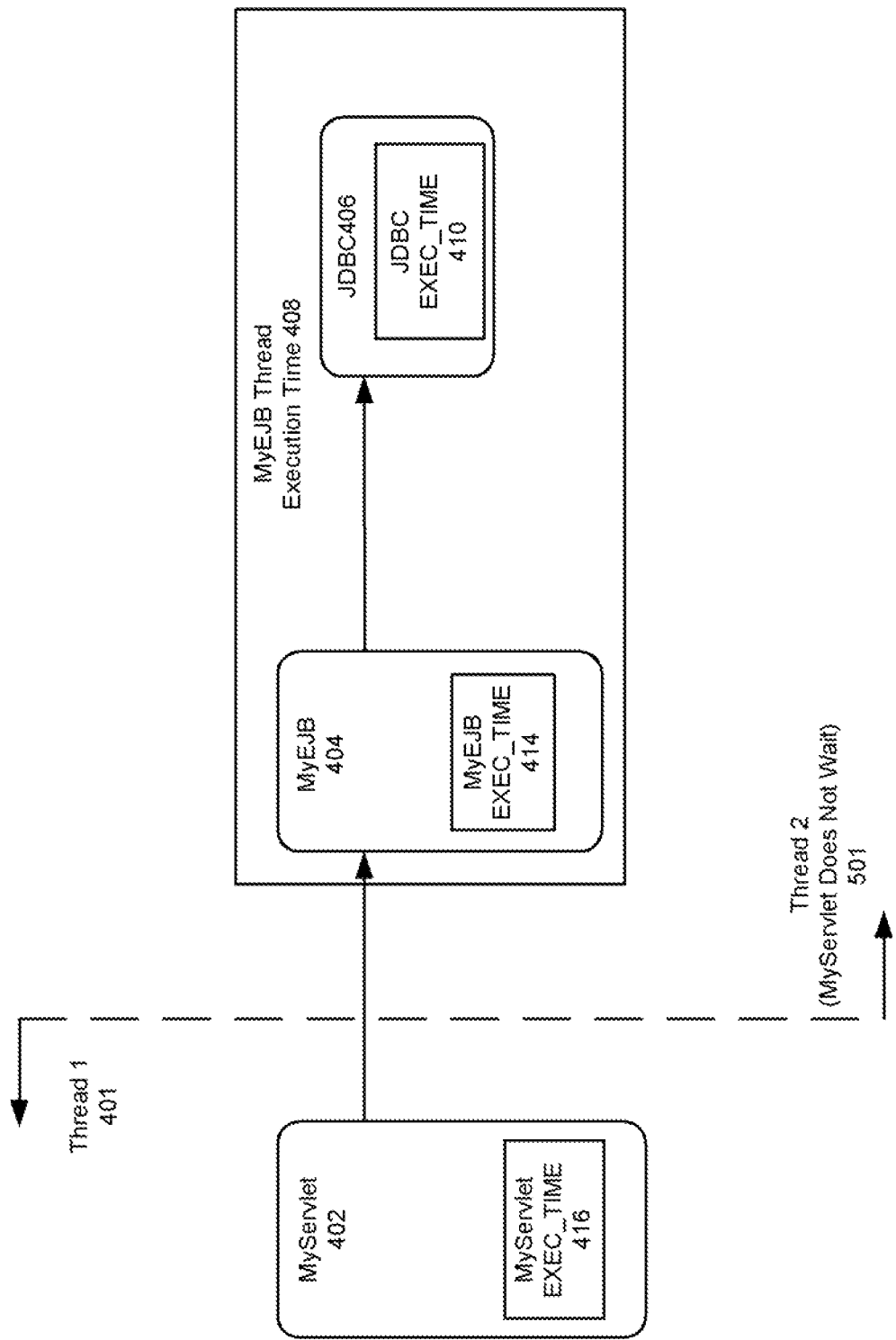

FIGS. 6-8 illustrate the effect of an application's structure on the collected request metrics, in accordance with an embodiment. Metrics collected at a specific component entry may or may not include the resource usage spent in other components. For example, general data gathering mechanism measurements are performed at the method invocation level and generally represent the resource consumption that is specific to the thread the method execution is performed in. Thus, the resource consumption information that is collected for the metric includes information related to the entire method execution for the current thread only. For example, FIG. 6 shows components MyServlet 402, MyEJB 404 and JDBC 406, where resource consumption metrics are gathered for a servlet invocation in Thread 1 400. In this example, the resource consumption metric gathered for each component is the execution time of that component, which can include CPU usage time, memory access time or another operation that takes some amount of time. For example, a JDBC thread metric execution time can include metric JDBC execution time 410; a MyEJB thread metric execution time 408 can include metric MyEJB execution time 414 and metric JDBC execution time; and a MyServlet thread metric execution time can include metric MyServlet execution time 416, metric MyEJB execution time and metric JDBC execution time. In accordance with an embodiment, when MyServlet is invoked, MyServlet calls MyEJB, which in turn uses JDBC. All of the work for these components is performed in Thread 1, and is included in the servlet execution time measurement MyServlet execution time.

FIGS. 7-8 illustrate the effect of an application's structure on the collected request metrics, in accordance with an alternate embodiment. As shown in FIG. 7, component MyServlet waits for component MyEJB and component JDBC to complete processing of work, and in FIG. 8, component MyServlet does not wait for component MyEJB and component JDBC to complete processing of work. In both figures, component MyServlet uses a work manager to perform the work of component MyEJB and component JDBC in Thread 2. Whether the execution time of MyEJB and JDB is included into the execution time of MyServlet depends on whether MyServlet waits for MyEJB and JDBC to complete processing of work.

As shown in FIG. 7, Thread 1 includes component MyServlet and Thread 2 501 includes components MyEJB and JDBC. In accordance with an embodiment, the execution time measurements for MyEJB and JDBC are included in the MyServlet execution time measurement since MyServlet waits for components MyEJB and JDBC to complete processing of work. Thus, the execution time resource consumption metric for MyServlet will include the process time of MyServlet along with the process time of MyEJB and JDBC.

Alternatively, as shown in FIG. 8, the execution time measurements for MyEJB and JDBC are not included in the MyServlet execution time measurement, since MyServlet does not wait for components MyEJB and JDBC to complete processing of work. Thus, the execution time resource consumption metric for MyServlet will not include the process time of MyEJB and JDBC.

2. Resource Management Based on Requests

Also described herein are systems and methods for collecting metrics by a workload manager (e.g., Application Server Work Load Manager/ASWLM) to provide Quality-of-Service and workload management.

Figure 9:
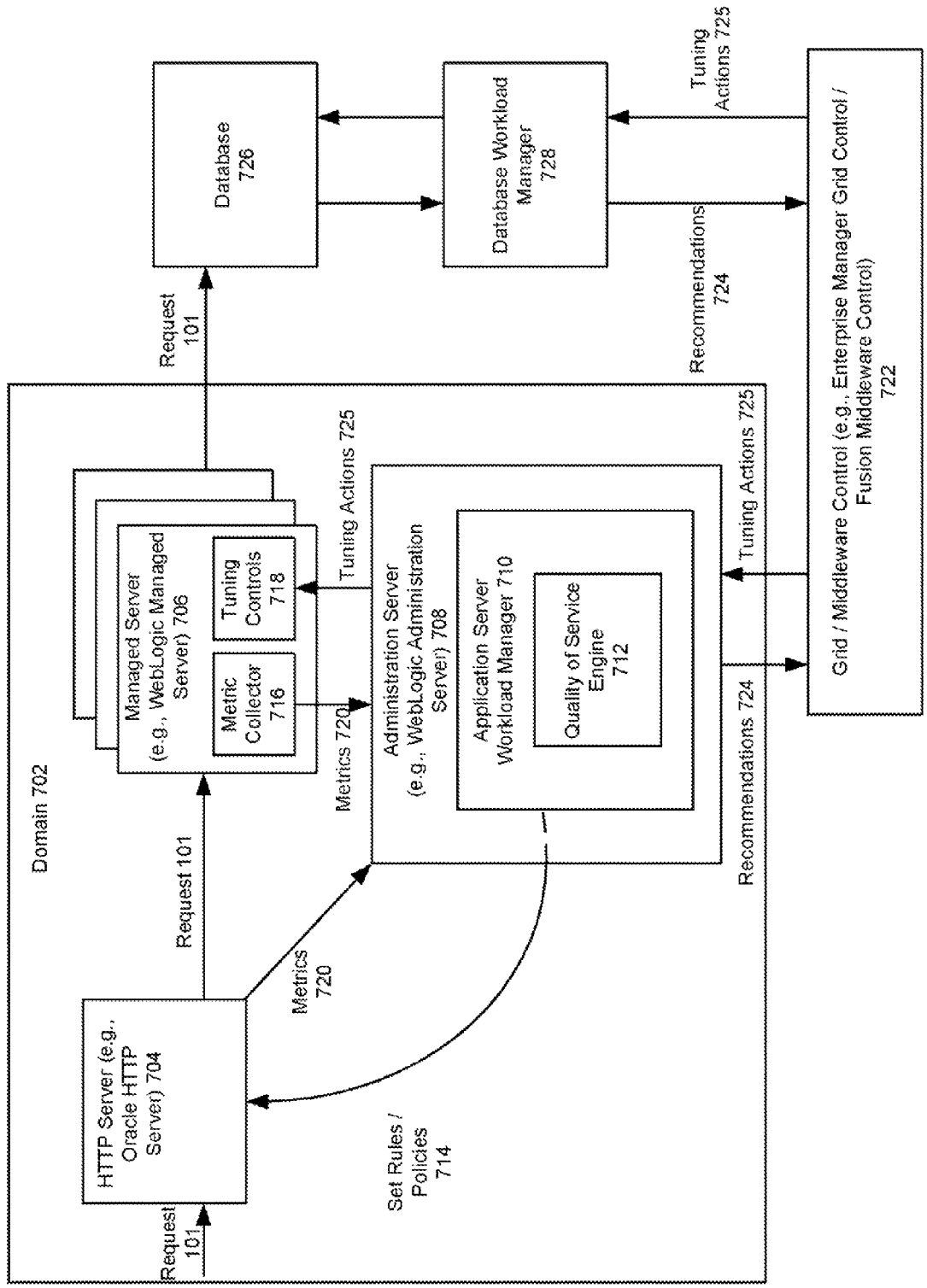
FIG. 9 shows an exemplary system of a Quality-of-Service component or other quality management component to provide Quality-of-Service management for an application server work load manager, in accordance with an embodiment.

FIG. 9 is an illustration of a system having a Quality-of-Service component or other quality management component to provide Quality-of-Service management features for an application server workload manager (e.g., Application Server Work Load Manager/ASWLM) to provide Quality-of-Service and workload management, in accordance with an embodiment. The system enables use of request metrics from one or more managed servers, e.g., by an application server workload manager running on an administration server which queries each managed server periodically and then uses the request metrics to perform Quality-of-Service and workload management. In accordance with an embodiment, incoming requests can be classified into different request types or performance classes, and assigned a priority based upon business objectives (referred to as performance objectives).

From a business point of view, requests belonging to one performance class may be more (or less) important than those belonging to another performance class. The system can manage the workload to ensure that the performance objectives of different performance classes are satisfied. When sufficient resources (CPU, memory, etc) are available they can be distributed so that the performance objectives for all performance classes are satisfied. Similarly, when sufficient resources are not available, resources from less business-critical performance classes can be diverted to more important ones so that overall business objectives are optimized. The system can also provide adjustment recommendations to an administrator, to help the administrator configure the system to better satisfy the performance objectives.

As shown in FIG. 9, domain 702 includes a HTTP/Web server 704 (e.g., Oracle HTTP Server/OHS), one or more managed Server 706 (e.g., WebLogic Managed Server), and an administration server 708 (e.g., WebLogic Administration Server). The administration server hosts an application server workload manager 710, which includes a Quality-of-Service engine/rules engine 712.

In accordance with an embodiment, the application server workload manager can store workload manager policies at the HTTP/Web server acting as a front-end tier to the system. The policies contain the definition of performance classes and their performance objectives. The HTTP/Web server parses the workload manager policies, and uses this information to classify incoming requests 101 in accordance with the policies. The requests flow from the HTTP/Web server to managed servers where each managed server collects and aggregates request metrics from the requests.

In accordance with an embodiment, each managed server includes metric collector 716 and tuning controls 718. The application server workload manager can query 720 each managed server periodically to collect its request metrics. In accordance with an embodiment, if some of the metrics can not be collected, a partial list of aggregated metrics can be returned to the application server workload manager.

The collected request metrics are then processed by the rules engine at the workload manager, which analyzes the request metrics and generates adjustment recommendations. For example, if a particular computer is in violation of the configured performance objectives, the adjustment recommendation may advise e.g., adjusting workload managers, adjusting server cluster size, adjusting connection pool size, and/or providing surge protection. In accordance with an embodiment, the metrics collected can be application server tier metrics and application server resource metrics. Application server tier metrics include a request count success (RCS) metric, average response time (ART) metric, layer active time (LAT) metric, and request count other (RCO) metric. Application server resource metrics include CPU resource use (RU) metric, and CPU resource wait (RW) metric.

For example, in accordance with an embodiment, the RCS metric can be defined as the actual count of requests per second in the application server layer. The ART metric can be defined as the total response time per second from the application server entry point through its tier and all lower tiers until the response is returned to the client from the application server tier. The LAT metric can be defined as the portion of the time spent in seconds in processing the request and response in the entry tier (e.g., the application server tier). The RCO metric can be defined as the actual count of requests that did not succeed due to for example an exception in the entry tier. The CPU RU metric can be defined as the portion of LAT made up of use of the CPU in seconds. The CPU RW metric can be defined as the portion of the LAT made up of wait for the CPU. The CPU RW metric can be tracked per RCID along with the resource usage collection metrics above. The JDBC connection Pool RU can defined as the portion of ART made up of use of any connection from this pool in seconds. This includes all time from the point of getting a connection out of the pool, to the point of returning the connection to the pool, including the time spent in lower tiers. The JDBC Connection Pool RW can be defined as the portion of the ART made up of wait for a connection pool. It will be evident that other examples can be provided.

In accordance with an embodiment, the policy set at the HTTP/Web server can be replicated to one or more other HTTP/Web server instances. A client can create the policies, which can be in the form of, e.g., an XML document. The policy set can contain a definition of performance classes and their performance objectives. The client can push the policy set to the application server workload manager service, and in turn the application server workload manager can store the policy set with the HTTP/Web server configuration. The HTTP/Web server instances will parse the policy set and stamp incoming requests in accordance with information provided in the policies. The application server workload manager can also read policies locally from the HTTP/Web server configuration directly at the administration server, gather metrics from each managed server's metric collector, feed gathered metrics from managed servers to the workload manager; and gather metric from the HTTP/Web server. If a performance class is in violation of performance objectives the administration server can generate tradeoff recommendations, alert a client such as Grid/Middleware Control 722 (e.g., Enterprise Manager Grid Control/Fusion Middleware Control) about the generated recommendation 724, apply tuning recommendations 725 at the client's request and inform the higher level i.e., HTTP/Web server, to start throttling if the system is over loaded and in danger of crashing.

In accordance with an embodiment, the grid/middleware control can be used to manage the application server workload manager and a database workload manager (DB-WLM), which includes a database 726. The grid/middleware control can create policies and can push the policies to the application server workload manager by invoking an operation on e.g., a Java management extension (JMX) managed bean or another application management tool. Once the policies have been communicated to the workload manager, the grid/middleware control activates the policies, and is able to perform the following actions: enable/disable collection of metrics for a performance class; retrieve recommendations, e.g., when a performance objective for a performance class is violated ask the system to provide recommendations to bring the performance objective back into compliance; activate the recommendations on the system; perform a what-if analysis; and fetch historical data.

Figure 10:
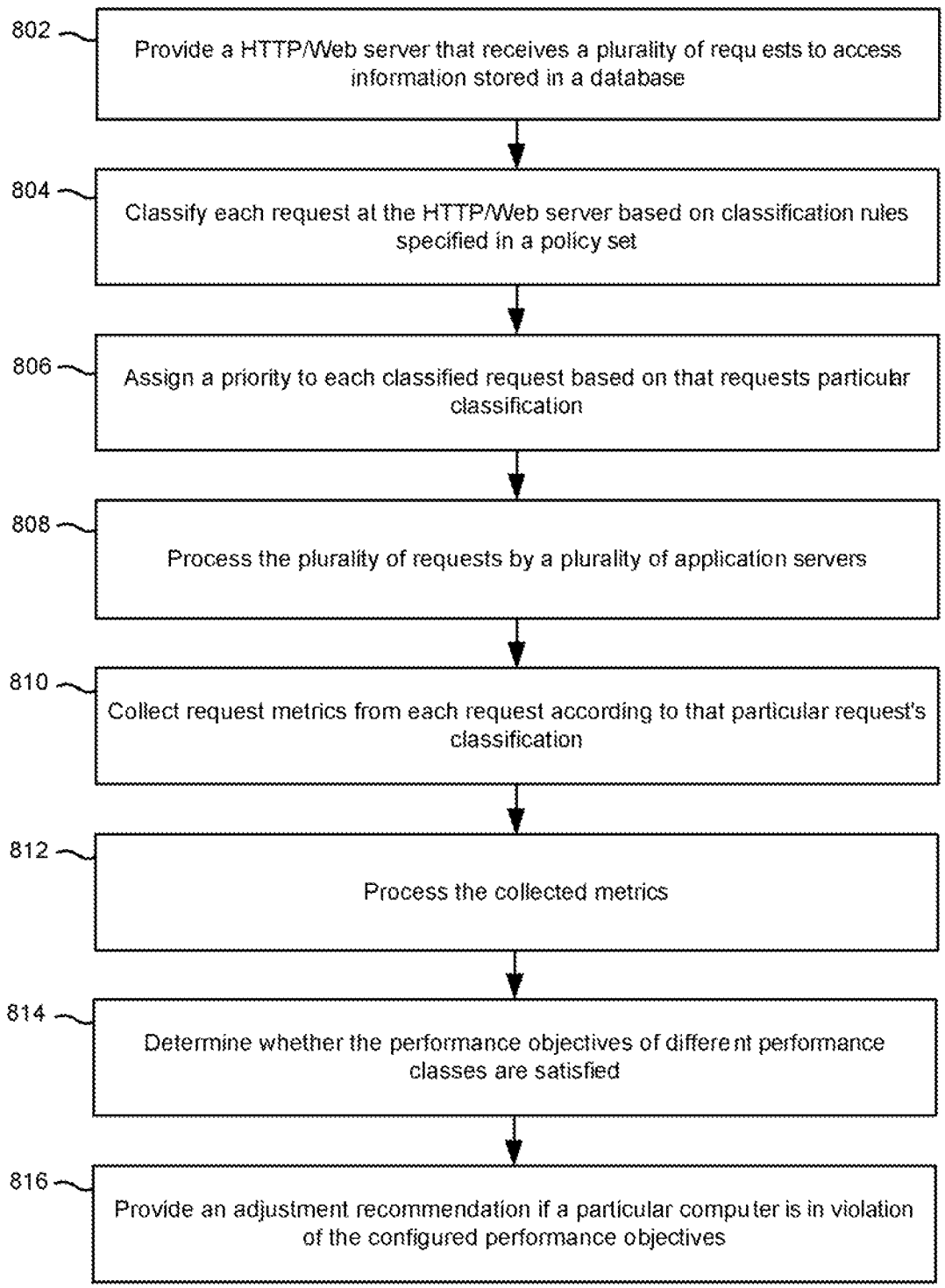
FIG. 10 shows a flowchart of a method in accordance with an embodiment, for providing Quality-of-Service management for an application server work load manager.

FIG. 10 shows a flow chart of a method for providing Quality-of-Service management features for an application server workload manager (e.g., Application Server Work Load Manager/ASWLM) to provide Quality-of-Service and workload management, in accordance with an embodiment.

At step 802, a HTTP/Web server is provided that receives a plurality of requests to access information stored in a database. At step 804, each request is classified at the HTTP/Web server based on classification rules specified in a policy set stored on the HTTP/Web server. In accordance with an embodiment, an application server workload manager can store workload manager policies at the HTTP/Web server acting as a front-end tier to the system. The policies contain the definition of performance classes and their performance objectives. The HTTP/Web server parses the workload manager policies, and uses this information to classify incoming requests in accordance with the policies. At step 806, a priority is assigned to each classified request based on that requests particular classification.

At step 808, the plurality of requests are processed by a plurality of managed servers. At step 810, request metrics are collected from each request according to that particular request's classification. For example, in accordance with an embodiment, requests flow from the HTTP/Web server to managed servers where each managed server collects and aggregates metrics from the requests. Each managed server includes a metric collector and tuning controls. The application server workload manager can query each managed server periodically to collect its metrics. In accordance with an embodiment, if some of the metrics can not be collected, a partial list of aggregated metrics can be returned to the application server workload manager. At step 812, the collected metrics are processed at a rules engine at a workload manager, which analyzes the metrics and generates adjustment recommendations. At step 814, it is determined whether the performance objectives of different performance classes are satisfied. At step 816, if a particular computer is in violation of the configured performance objectives, the adjustment recommendation may advise e.g., adjusting workload managers, adjusting server cluster size, adjusting connection pool size, and/or providing surge protection.

Figure 11:
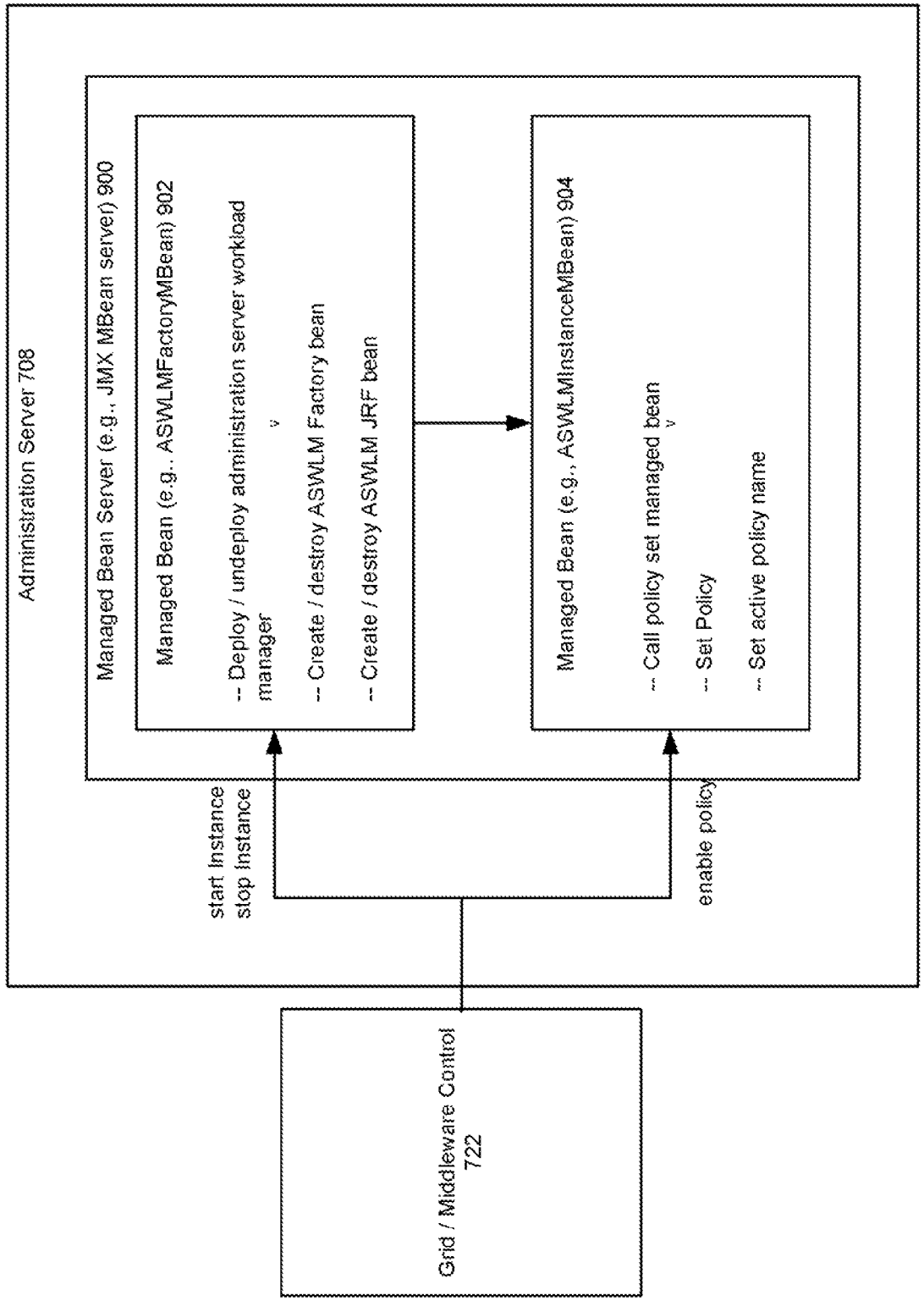
FIG. 11 is an illustration of the interaction between the grid/middleware control and managed beans to configure the application server workload manager, in accordance with an embodiment.

In accordance with an embodiment, the application server workload manager can be an application (e.g., a Java EE application) running on an application server, and can be configured using managed beans (e.g., JMX managed beans). For example, FIG. 11 illustrates the interaction between the grid/middleware control and managed beans on a managed bean server 900 to configure the application server workload manager, in accordance with an embodiment. As shown in FIG. 11, a first and second managed bean is available on the administration server. The first managed bean can be application server workload manager (ASWLM) factory bean 902 (e.g., ASWLMFactoryMBean bean) and the second managed bean can be an application server workload manager instance bean 904 (e.g., ASWLMInstanceMBean bean). The ASWLM factory bean can operate in a runtime managed bean server (e.g., a JMX MBean server) 906 along with other application server runtime managed beans.

The ASWLM factory bean can set the life cycle of an application server workload manager. For example, a grid/middleware control can invoke a create method to create an instance of the application server workload manager called ASWLM instance bean (e.g., ASWLMInstanceMBean), which can result in deployment of the application server workload manager on an administration server, and creation of ASWLM instance bean. The ASWLM instance bean can deploy/undeploy application server workload manager, create/destroy ASWLM factory bean, and create/destroy other ASWLM beans, such as Java Required File (JRF) managed beans.

The ASWLM instance bean can expose the application server workload manager functionality as a set of operations, e.g., JMX operations, and can implement a common interface across all workload manager implementations. In accordance with an embodiment, the ASWLM instance bean can further set the QoS component policies on a managed bean that can be part of the HTTP/Web server configuration.

In accordance with an embodiment, the parameters and the output of ASWLM instance bean operations can be either primitive types or XML string objects. Table 7 is provided for purposes of illustration, and that in accordance with other embodiments, other XML schemas can be used for constructing the XML documents.

TABLE 7

| S. No. | Document | Description |
| --- | --- | --- |
| 1. | WLMPolicySet | Describes the WLM configuration. It includes request classifications and performance objectives. It also includes topology and constraint information for various WLM types. |
| 2. | WLMMetrics | Describes metric data that is collected at run time. |
| 3. | WLMMetrics | Contains a list of recommended resource allocation settings, estimated satisfaction metrics and estimated collected metrics. |
| 4. | RescAllocSet | Represents allocation of resources and the associated knob settings |
| 5. | WLMHistData | Represents the historical data for the specified time interval |
| 6. | WLMStatus | Contains the status information of the WLM service. |
| 7. | WhatIf_Output | Contains the result of What-If Analysis. |

In accordance with an embodiment, the document flow between a grid/middleware control and administration server can include policy set (e.g., WebLogic policy set), communicated from the grid/middleware to the administration server. The policy set describes the administration server configuration, includes request classifications and performance objectives, and also includes topology and constraint information for various workload manager types. The administration server in return communicates documents to the grid/middleware control. These documents can describe the metrics that are collected (e.g., WLMMetrics documents), describe the resource allocation set (e.g., RescAllocSet documents), represent history data (e.g., WLMHistData documents), contain the status information (e.g., WLMStatus documents), and contain the result of the recommendation analysis (e.g., WhatIf_Output documents), and are described in Table 7.

Figure 12:
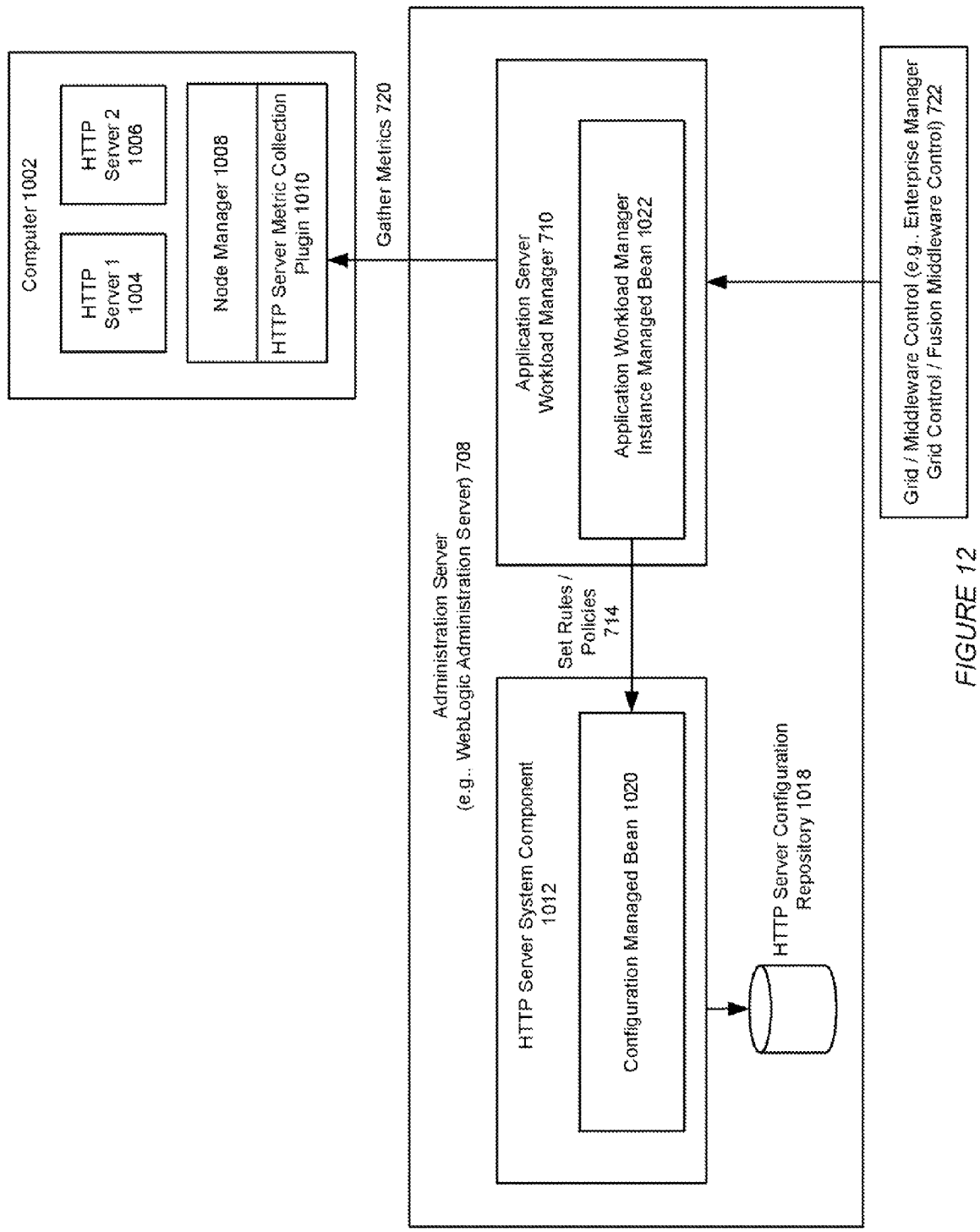
FIG. 12 is an illustration of the interaction between an administration server workload manager and HTTP/Web server, in accordance with an embodiment.

FIG. 12 is an illustration of the interaction between the administration server and HTTP/Web server for request classification, metrics, and control API to stop sending requests for a particular request class, in accordance with an embodiment.

As shown in FIG. 12, computer 1002 includes HTTP/Web server 1 1004 (e.g., Oracle HTTP Server/OHS), HTTP/Web server 2 1006, node manager 1008, and HTTP/Web server Metric Collection Plugin 1010. HTTP/Web server 1 and HTTP/Web server 2 can be represented on an administration server as a HTTP/Web system component 1012, which is a representation of an external service in the administration application server. The configuration of the HTTP/Web system component can reside on the administration server, and can be propagated to one or more other computers.

In accordance with an embodiment, the administration server includes an application server workload manager, HTTP/Web server system component, and HTTP/Web server configuration repository 1018. The application server workload manager can store both the QoS component policies and the current active policy information in a configuration managed bean 1020 (e.g., a JRF Configuration MBean) at the HTTP/Web server system component, which can be made part of the HTTP/Web server configuration stored at the HTTP/Web server configuration repository.

Storing both QoS component policies and the current active policy information as part of the HTTP/Web server configuration allows for automatic replication as soon as a new instance of a HTTP/Web server is created or a policy is updated. For example, the application server workload manager can read both the QoS component policies and the current active policy directly from the HTTP/Web server configuration since it will be collocated on the administration server, and the administration server can coordinate with the HTTP/Web server for configuration integration.

In accordance with an embodiment, the application server workload manager can collect metric data from HTTP/Web server 1 and HTTP/Web server 2, or any number of HTTP/Web servers. The HTTP/Web servers can make metric data available by providing a HTTP/Web metric collection plugin in the node manager.

The metrics can include request count success (RCS), average response time (ART), layer active time (LAT) and request count other. The metric data can be surfaced e.g., via JMX by a grid/middleware control (e.g., Enterprise Manager Grid Control/Fusion Middleware Control). The grid/middleware control can interact with the application server workload manager instance managed bean 1022 to configure the application server workload manager. For example, the grid/middleware control can set policies on the application server workload manager instance managed bean, which are communicated to the configuration managed bean at the HTTP/Web server system component. The policy is implemented at each HTTP/Web server instance. The application server workload manager can interact with the HTTP/Web servers indirectly using JMX. The node manager can host a set of system component plugins, and can host a HTTP/Web plugin. The application server workload manager can communicate with the node manager to gather metrics and statistical data from the HTTP/Web server plugin via JMX.

FIGS. 13-18 illustrate adjustment recommendations that can be used to bring a performance class back into compliance, in accordance with an embodiment. For example, in accordance with an embodiment, the collected request metrics are processed by a rules engine at an application server workload manager, which analyzes the request metrics and generates adjustment recommendations. If a particular server is in violation of the configured performance objectives, the adjustment recommendation may advise e.g., adjusting workload managers, adjusting server cluster size, adjusting connection pool size, and/or providing surge protection. The application server workload manager can attempt to provide recommendations in the order listed above.

For example, the application server workload manager can first recommend adjusting the thread allocations among performance classes within the administration server, then the application server workload manager can recommend loaning a server from another cluster if available, and finally the application server workload manager can recommend adjusting the connection pools. The surge protection recommendation can be provided if it is found that none of the other recommendations are going to be helpful.

Figure 13:
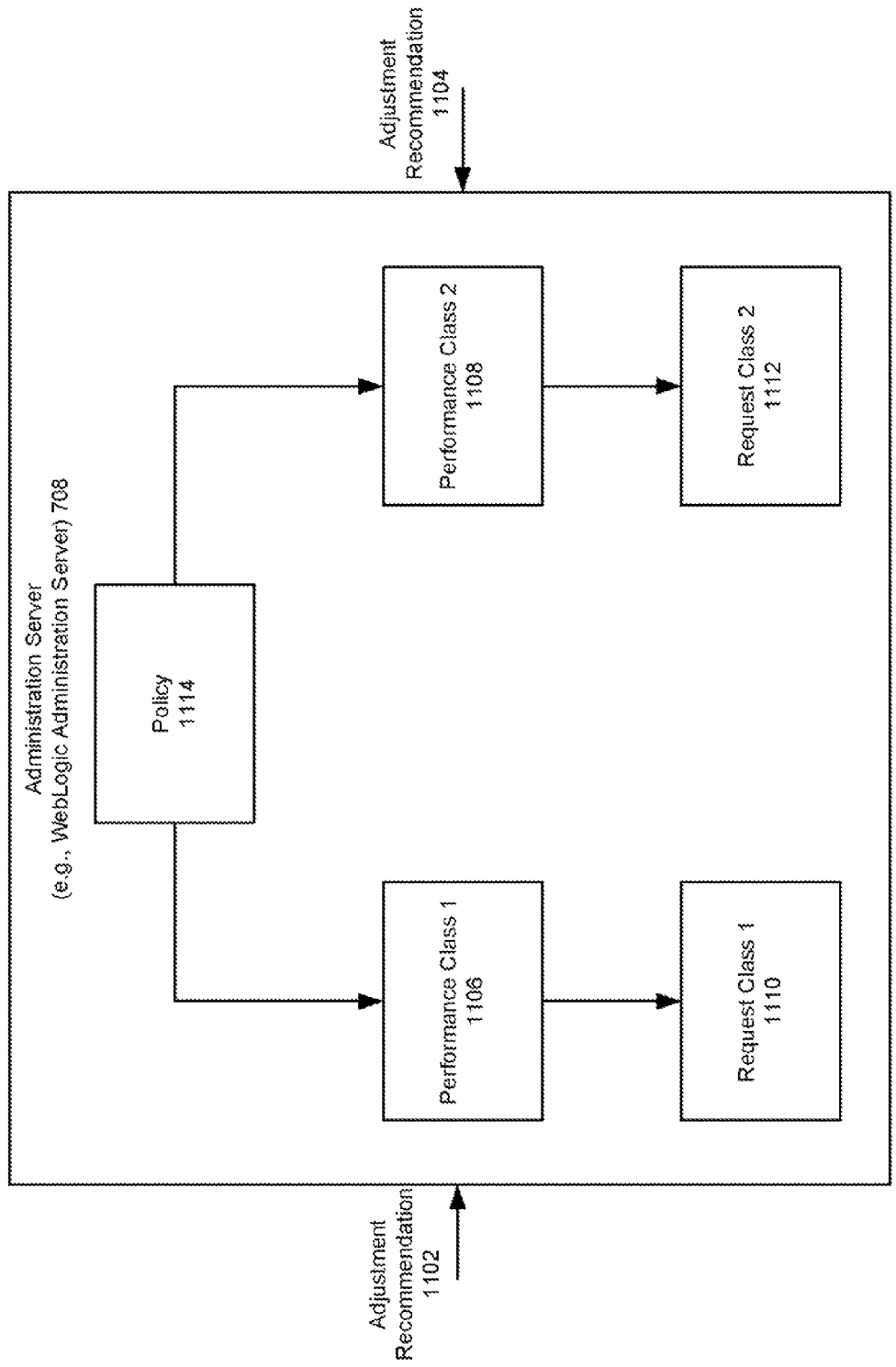
FIGS. 13-18 are an illustration of recommending adjustments, in accordance with an embodiment.
Figure 14:
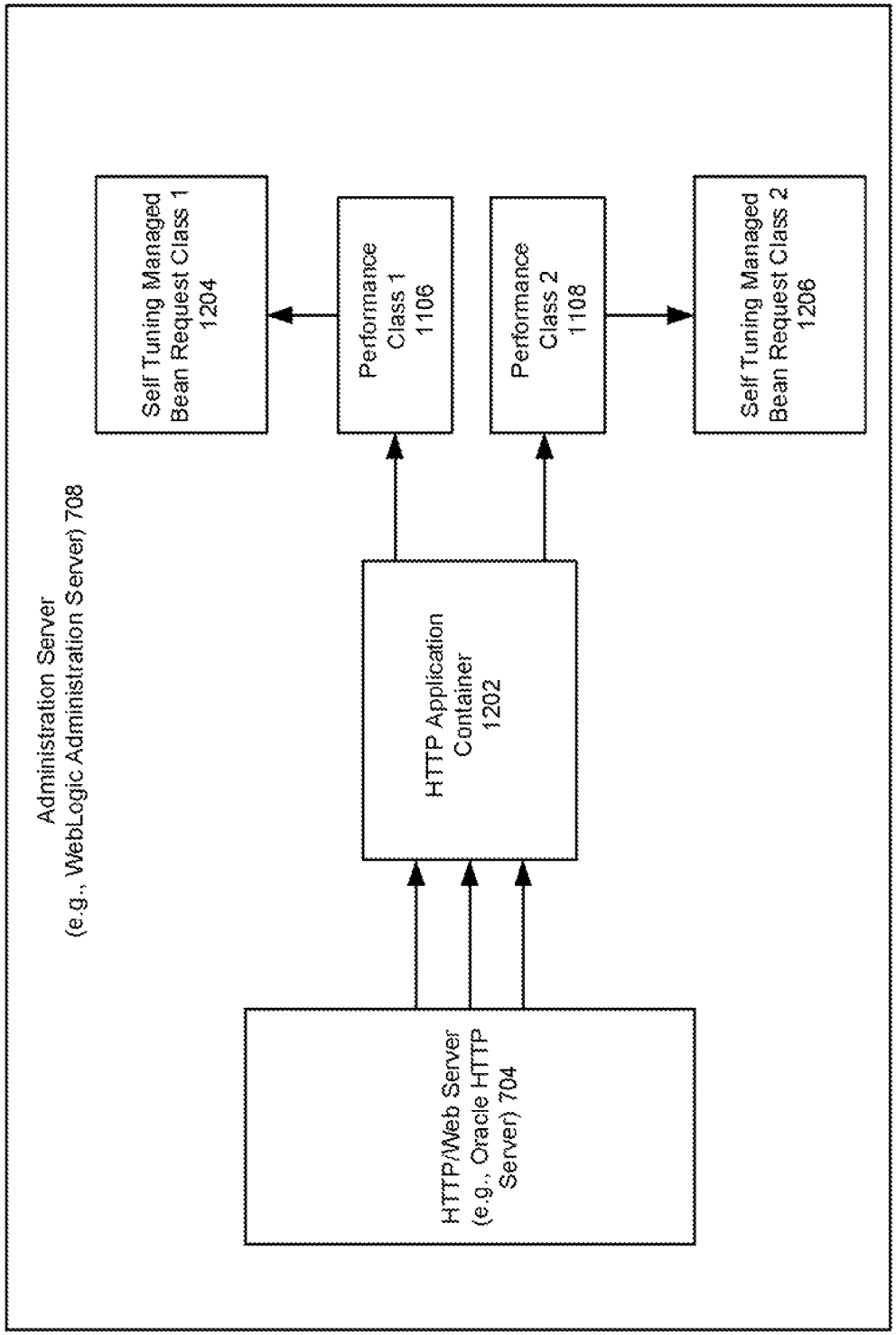

FIG. 13 and FIG. 14 illustrate adjustment recommendations to recommend changes to a request class associated with a performance class to bring a performance class back into compliance. In accordance with an embodiment, the rule recommends what performance class needs to be adjusted and what should be the new value of a request class.

As shown in FIG. 13, an administration server includes a policy 1114, performance class 1 1106, performance class 2 1108, and recommendation class 1 1110 and recommendation class 2 1112. Adjustment recommendations 1102, 1104 are received at the administration server and recommend changes to application server request class 1 and application server request class 2, each associated with a performance class. For example, the adjustment recommendations can recommend performance class adjustments and a new value for a request class, which can ensure that the application server thread resources are adjusted in order to achieve the performance objective.

In accordance with an embodiment, the administration server provides thread management to bring a performance class back into compliance. For example, a request entering an application server can be assigned to a work manager, and the work manager schedules the request based upon its configured policy. The policy defines the performance class and the associated request class. The application server can have two types of request classes—a fair share request class and a response time request class. The combination of work managers and request classes provide control on work priority. The performance classes can be adjusted if they can be mapped and tied to an application server fair share request class directly. When a performance class requires more resources, the performance classes underlying request class will be allocated more resources.

As shown in FIG. 14, an administration server includes a HTTP/Web server, HTTP/Web application container 1202, performance class 1 and performance class 2, and self tuning managed bean request class 1 1204 and self tuning managed bean request class 2 1206. In accordance with an embodiment, the HTTP/Web application container identifies a performance class associated with a request and assigns the request to a request class.

If a performance class is classified based upon a web application module's context root, then the performance class can automatically map to a unique request class because all such requests can be handled by a unique work manager.

If multiple performance classes are configured within a single context root, e.g., performance class 1 for myapp/browse and performance class 2 for myapp/checkout URI's, then by default, requests for both performance class 1 and performance class 2 will be communicated to the same request class, and any performance class level tuning at application server will not be possible. To tune a performance class level, a request class is configured for every performance class in a self tuning bean (e.g., SelfTuningMBean). The HTTP/Web application container ensures that a request belonging to a performance class is directed to its own request class. This way, any type of performance class can be tuned in the application server.

In accordance with an embodiment, the following collected metrics can be utilized to recommend changes to a request class associated with a performance class: Request Count Success (RCS), Average Response Time (ART), Layer Active Time (LAT), CPU RU, and CPU RW. The rule recommends adjusting resources from a low priority performance class to a higher priority performance class.

FIGS. 15-18 illustrate an adjustment recommendation to trade a computing node from a low priority performance class to a high priority performance class to meet the performance objective. For example, where multiple clusters running in a domain on physical machines (e.g., servers), and each computer node is only hosting instances of one application server cluster, a recommendation may be generated to trade a computing node from low priority performance class to a high priority performance class to meet the performance objective.

Figure 15:
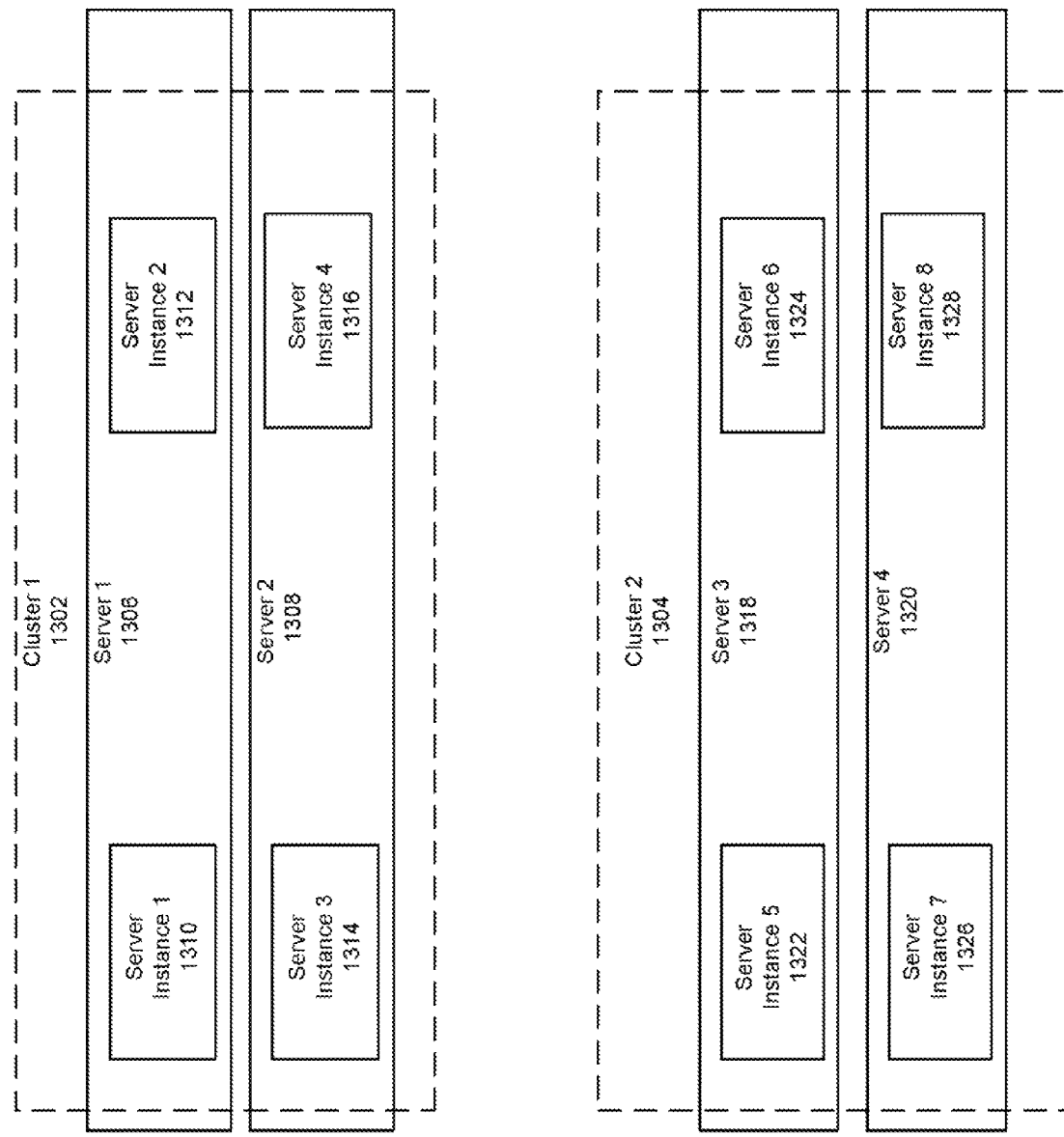

As shown in FIG. 15, multiple clusters are running in a domain on physical machines (e.g., servers), where each computer node is only hosting instances of one application server cluster. Four computing nodes are situated in two clusters. Cluster 1 1302 includes server 1 1306 and server 2 1308, where server 1 includes server instance 1 1310 and server instance 2 1312, and server 2 includes server instance 3 1314 and server instance 4 1316. Cluster 2 1304 includes server 3 1318 and server 4 1320, where server 3 includes server instance 5 1322 and server instance 6 1324, and server 4 includes server instance 7 1326 and server instance 8 1328.

Figure 16:
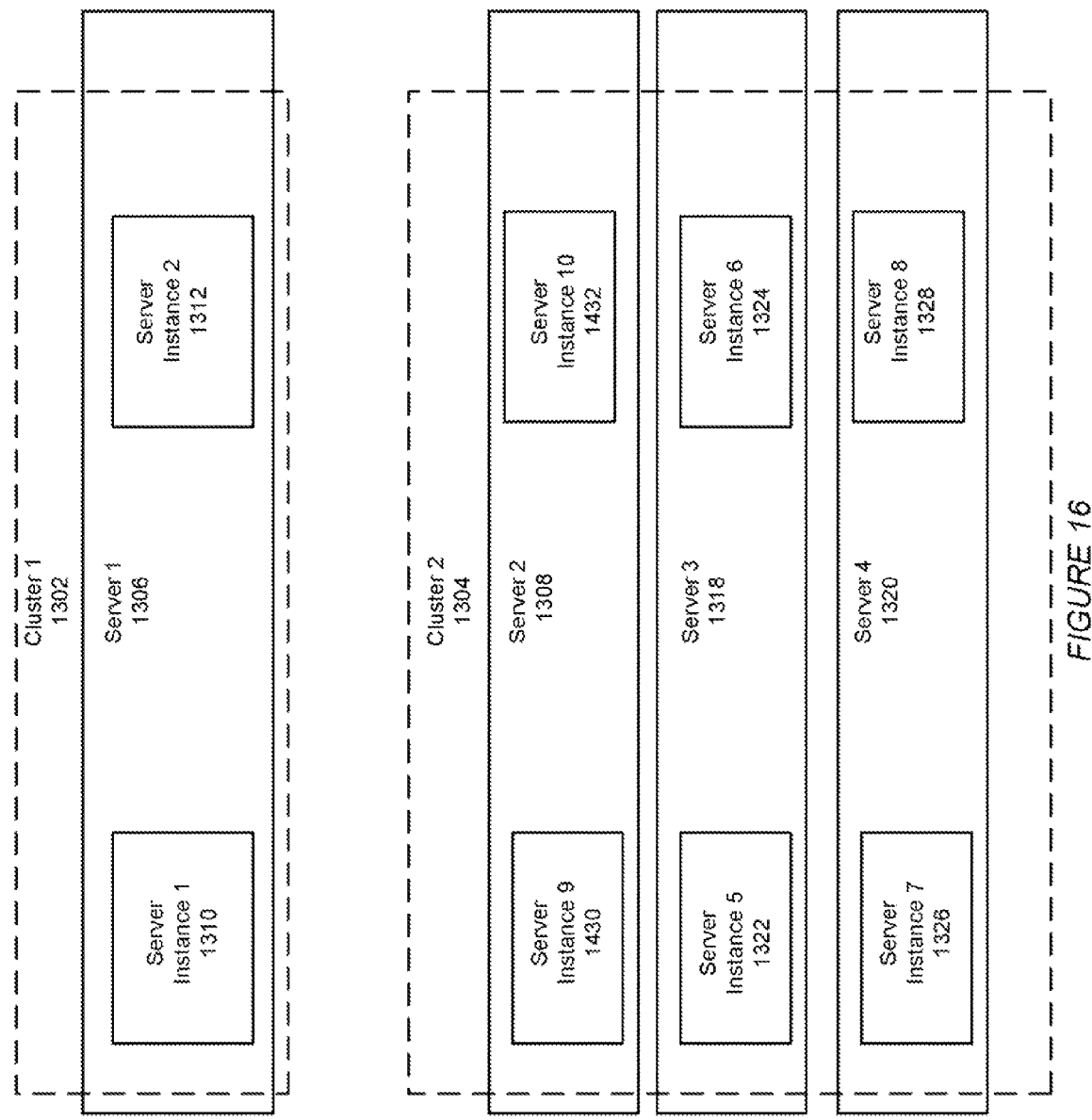

FIG. 16 illustrates trading a computing node from low priority performance class to a high priority performance class to meet the performance objective. As shown in FIG. 16, an application server workload manager at the administration server application server has recommended taking the server instance 2 computing node away from cluster 1, and trading it to cluster 2 to achieve the performance objective. Cluster 2 is now running additional server instance 9 and server instance 10, and server instance 3 and server instance 4 of cluster 1 have been stopped. Cluster 1 includes server 1, where server 1 includes server instance 1 and server instance 2. Cluster 2 now includes server 2, server 3 and server 4, where server 2 includes new server instance 9 1430 and new server instance 10 1432, server 3 includes server instance 5 and server instance 6, and server 4 includes server instance 7 and server instance 8. To meet the performance objective, server 2 was moved from cluster 1 to cluster 2.

Figure 17:
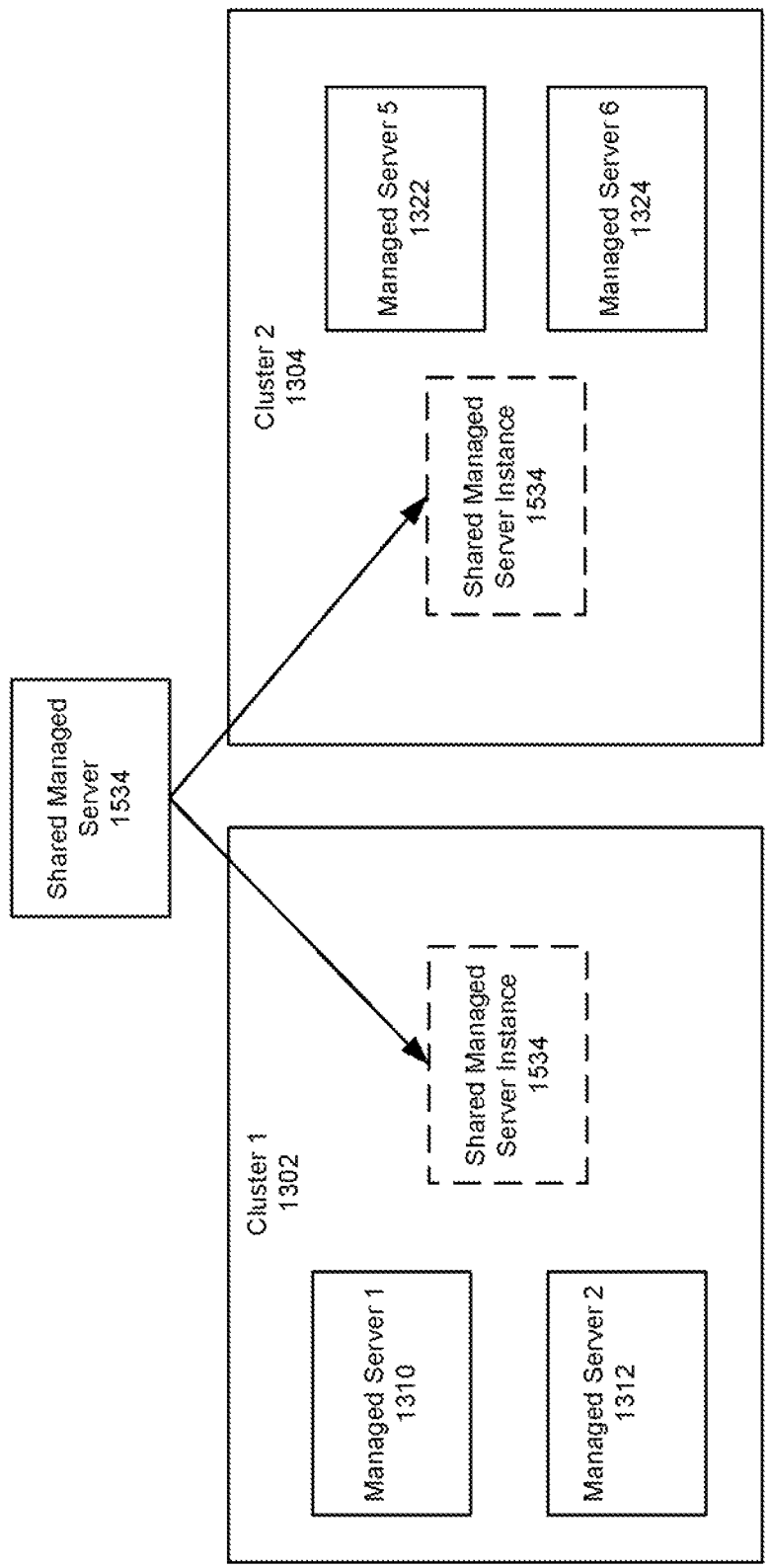

FIG. 17 illustrates a sharable managed server instance. In accordance with an embodiment, moving a server from one cluster to another cluster can take long time, especially if the application(s) to be deployed are large. In order to minimize the time, a sharable managed server instance can be used. A sharable managed server instance is an instance which has combined applications of two clusters, and an application can be targeted to a particular cluster.

As shown in FIG. 17, cluster 1 includes managed server 1 and managed server 2. Cluster 2 includes managed server 5 and managed server 6. Upon instantiating a sharable managed server instance 1534, there can be a sharable managed server instance on cluster 1 or cluster 2. The sharable managed server instance includes all applications targeted to cluster 1 and cluster 2. When assigning the sharable managed server instance to cluster 1, applications targeted to cluster 2 are stopped, applications targeted to cluster 1 are started, and server instance is added to cluster 1. When assigning the sharable managed server instance to cluster 2, applications targeted to cluster 1 are stopped, applications targeted to cluster 2 are started, and managed sharable server instance is added to cluster 2.

Figure 18:
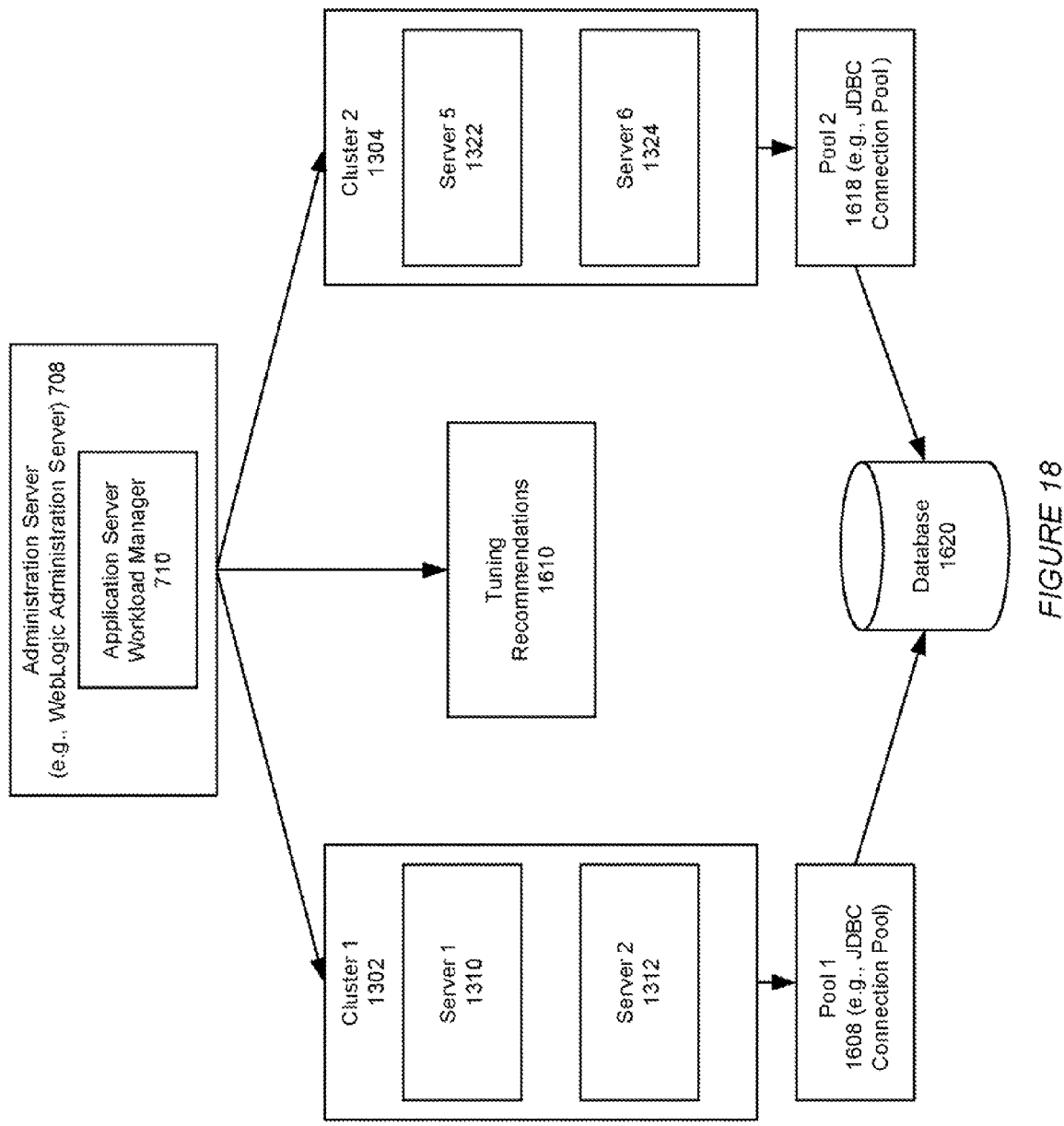

FIG. 18 illustrates an adjustment recommendation to recommend tuning connection pools (e.g., JDBC connection pools) in order to bring a violating performance class into conformance. As shown in FIG. 18, cluster 1 includes server 1 and server 2. Although two servers are shown, cluster 1 can include more or less servers. Cluster 2 includes server 5 and server 6. Each cluster uses a dedicated connection pool (e.g., JDBC connection pool) and at least one performance class configured. Cluster 1 uses connection pool 1 1608, and cluster 2 uses connection pool 2 1618. Tuning recommendations 1610 are used to adjust the connections among connection pool 1 and connection pool 2, where each connection pool shares the same database 1620. In accordance with an embodiment, if a connection pool is shared by more than one performance class, then no recommendations will be produced as connection allocation at the performance class level cannot be controlled. In accordance with an embodiment, the recommended new connection pool size can be based upon what-if analysis. The recommendations can suggest the maximum number of allowed connections for a JDBC pool to be lowered if resources need to be shifted to another connection pool. The maximum and minimum capacity constraints can be configured in the policy set.

In accordance with an embodiment, the following collected metrics can be utilized to recommend allocating a server instance from one cluster to another cluster: Request Count Success (RCS), Average Response Time (ART), Layer Active Time (LAT), CPU RU, CPU RW, Connection Pool RU and Connection Pool RW.

In accordance with an embodiment, a surge protection rule is available if every attempt fails to bring violating a performance class to conformance. For example, if it is determined that none of the potential tuning recommendations will bring a violating performance class to conformance, the surge protection rule can be triggered. The surge protection rule recommends the HTTP/Web server to stop sending requests for a certain performance class. Once the system has stabilized, the system will recommend enabling requests for the blocked performance class. In accordance with an embodiment, the following collected metrics can be utilized to recommend the surge protection rule: Request Count Success (RCS), Average Response Time (ART), Layer Active Time (LAT), CPU RU and CPU RW Example Use Cases In accordance with various embodiments, the system can be implemented to support a variety of different use cases and applications. Some examples of these use cases and applications are described below by way of illustration. It will be evident that embodiments of the invention can be implemented to support other use cases and applications, and that the invention is not limited to the example provided herein.

For example, an administrator or a user may be responsible for managing a common admin model (CAM) domain. The CAM domain hosts internal finance and wiki applications on a set of shared hardware resources. The finance application is deemed very critical for the company's business and has strict QoS requirements. The application server workload manager (ASWLM) QoS feature is enabled in the domain to ensure that the finance application continues to meet its performance objective under all load conditions. The administrator is aware that there is a clear usage pattern for the finance application because it experiences heavy usage towards the end of the quarter. However, the wiki application's usage pattern is random and its availability is less important to the company than that of the finance application. In order to meet the performance objective of the finance application under heavy load, the administrator has defined two performance classes, one for each application, with a higher priority for the finance performance class. When the finance application experiences higher load, the ASWLM running on an administration server (e.g., a WebLogic/WLS Administration Server) will shift the resources away from the wiki application and will make them available to the finance application to ensure that it continues to meet its performance objective. Hence ASWLM can help the administrator meet the QoS requirement for his business applications.

An administrator may be responsible for managing two Java EE applications in a CAM domain that each run in separate WLS cluster. The IT team has done extensive capacity planning and has come up with an optimum cluster size to meet the user load. However, the administrator has found that at certain times, unpredicted user surge makes one application cluster overloaded, while at the same time the other application cluster is under utilized. The ASWLM QoS feature can provide the ability to quickly move a WLS managed server instance from under utilized cluster to the overloaded one. Thus, server resources can be dynamically allocated and de-allocated among WLS server clusters using the QoS capabilities provided by ASWLM.

An administrator may be responsible for managing a mission critical application in a large CAM domain with a 32 node WLS cluster backed by a cluster database (e.g., an Oracle Real Application Cluster/RAC). The availability of the application is critical to the business and any downtime could be costly. The system experienced unavailability when a login storm caused the opening of large number of Java Database Connectivity (JDBC) connections to the database, which brought the entire cluster to a halt. It took the administrator a while to figure out the root cause of the problem, which could have been avoided if the system could have surfaced that certain types of requests are over-loading the system. In that case, the upper layer could have temporarily stopped accepting certain types of requests until the system could be stabilized. The ASWLM QoS feature provides the ability to group user requests into coarse grained performance classes. ASWLM can make it possible to aggregate and report the performance of user requests at performance class level, and can generate recommendations in real time to ensure that adequate level of service availability is in place in extreme load conditions.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for providing quality of service management for an application server workload manager, comprising:
   an http server that receives a plurality of requests to access information stored in a database, wherein each request is classified at the http server based on classification rules specified in a policy set stored on the http server, and wherein each classified request is assigned a priority based on that requests particular classification;
   a plurality of application servers that process the plurality of requests, wherein as the plurality of requests flow through the system, request metrics are collected from each request according to that particular request's classification;
   an administration server that includes an application server workload manager, wherein the application server workload manager communicates with the http server, and wherein upon receiving the plurality of requests at the http server the application server workload manager gathers metrics from the requests received at the plurality of application servers, wherein the gathered metrics are associated with the classification of the request received, and
   monitors system performance based on the metrics.

2. The system of claim 1, wherein the http server is an Oracle HTTP Server.

3. The system of claim 1, wherein the plurality of application servers are WebLogic Managed Servers.

4. The system of claim 1, wherein the application server workload manager includes a quality of service engine/rules engine, and wherein the gathered metrics are processed by the quality of service/rules engine at the workload manager, which analyzes the request metrics and generates adjustment recommendations.

5. The system of claim 4, wherein the adjustment recommendations are one of adjusting workload managers, adjusting server cluster size, adjusting connection pool size, and providing surge protection.

6. The system of claim 5, wherein adjusting workload managers includes adjusting a performance class, and setting a new value of a request class.

7. The system of claim 5, wherein adjusting server cluster size includes trading a computing node from a low priority performance class to a high priority performance class to meet the performance objective.

8. The system of claim 5, wherein adjusting server cluster size includes creating a sharable managed server instance, wherein the sharable managed server instance has combined applications of two clusters, and active applications are targeted to a cluster to which the server instance belongs.

9. The system of claim of claim 5, wherein adjusting connection pool size includes setting the maximum number of allowed connections for a connection pool to be lowered if resources need to be shifted to another connection pool.

10. The system of claim 5, wherein surge protection includes recommending to the HTTP server to stop sending requests for a certain performance class.

11. A method for providing quality of service management for an application server workload manager, comprising:
 providing an http server that receives a plurality of requests to access information stored in a database, wherein each request is classified at the http server based on classification rules specified in a policy set stored on the http server, and wherein each classified request is assigned a priority based on that requests particular classification;
 providing a plurality of application servers that process the plurality of requests, wherein as the plurality of requests flow through the http server and the application servers, request metrics are collected from each request according to that particular request's classification;
 providing an administration server that includes an application server workload manager, wherein the application server workload manager communicates with the http server, and wherein upon receiving the plurality of requests at the http server the application server workload manager
  gathers metrics from the requests received at the plurality of application servers, wherein the gathered metrics are associated with the classification of the request received, and
  monitors system performance based on the metrics.

12. The method of claim 11, wherein the plurality of application servers are WebLogic Managed Servers.

13. The method of claim 11, wherein the application server workload manager includes a quality of service engine/rules engine, and wherein the gathered metrics are processed by the quality of service/rules engine at the workload manager, which analyzes the request metrics and generates adjustment recommendations.

14. The method of claim 13, wherein the adjustment recommendations are one of adjusting workload managers, adjusting server cluster size, adjusting connection pool size, and providing surge protection.

15. The method of claim 14 wherein adjusting workload managers includes adjusting a performance class, and setting a new value of a request class.

16. The method of claim 14, wherein adjusting server cluster size includes trading a computing node from a low priority performance class to a high priority performance class to meet the performance objective.

17. The method of claim 14, wherein adjusting server cluster size includes creating a sharable managed server instance, wherein the sharable managed server instance has combined applications of two clusters, and active applications are targeted to a cluster to which the server instance belongs.

18. The method of claim of claim 14, wherein adjusting connection pool size includes setting the maximum number of allowed connections for a connection pool to be lowered if resources need to be shifted to another connection pool.

19. The method of claim 14, wherein surge protection includes recommending to the HTTP server to stop sending requests for a certain performance class.

20. A non-transitory computer readable storage medium storing one or more sequences of instructions for providing quality of service management for an application server workload manager, wherein said instructions, when executed by one or more processors, cause the one or more processors to execute the steps of:
 provide an http server that receives a plurality of requests to access information stored in a database, wherein each request is classified at the http server based on classification rules specified in a policy set stored on the http server, and wherein each classified request is assigned a priority based on that requests particular classification;
 provide a plurality of application servers that process the plurality of requests, wherein as the plurality of requests flow through the http server and the application servers, request metrics are collected from each request according to that particular request's classification;
 provide an administration server that includes an application server workload manager, wherein the application server workload manager communicates with the http server, and wherein upon receiving the plurality of requests at the http server the application server workload manager
  gathers metrics from the requests received at the plurality of application servers, wherein the gathered metrics are associated with the classification of the request received, and
  monitors system performance based on the metrics.

* * * * *

UNITED STATES PATENT AND TRADEMARK OFFICE
CERTIFICATE OF CORRECTION

PATENT NO. : 8,849,910 B2
APPLICATION NO. : 13/298211
DATED : September 30, 2014
INVENTOR(S) : Inamdar et al.

Page 1 of 1

It is certified that error appears in the above-identified patent and that said Letters Patent is hereby corrected as shown below:

Title Page, item (56),

On page 2, column 2, under Other Publications, line 3, delete "UNSENIX" and insert -- USENIX --, therefor.

In the Drawings,

In drawings, 2 of 18, in figure 2, under Reference Numeral 216, line 2, delete "perform ance" and insert -- performance --, therefor.

In drawings, 3 of 18, In figure 3, line 29, delete "retrived." and insert -- retrieved. --, therefor.

In drawings, 10 of 18, In figure 10, under Reference Numeral 802, line 1, delete "requ ests" and insert -- requests --, therefor.

In the Specification,

In column 1, line 30, delete "et." and insert -- et --, therefor.

In column 9, line 44, delete "RCI Ds" and insert -- RCIDs --, therefor.

In column 17, line 2, delete "WhatIf" and insert -- WhatIf --, therefor.

In column 20, line 50, delete "RW" and insert -- RW. --, therefor.

In the Claims,

In column 23, line 1, in Claim 9, after "claim" delete "of claim".

In column 24, line 11, in Claim 18, after "claim" delete "of claim".

Signed and Sealed this
Twenty-eighth Day of April, 2015

Michelle K. Lee
*Director of the United States Patent and Trademark Office*